(12) United States Patent
Harris et al.

(10) Patent No.: US 10,279,706 B2
(45) Date of Patent: May 7, 2019

(54) ADJUSTING DEVICE FOR LONGITUDINAL ADJUSTMENT OF A VEHICLE SEAT AND RETAINER FOR USE IN SUCH AN ADJUSTING DEVICE

(71) Applicant: Brose Fahrzeugteile GmbH & Co. KG, Coburg, Coburg (DE)

(72) Inventors: Daryl Harris, Oxford, MI (US); David Becker, Oakland Township, MI (US); Karam Jalil, Novi, MI (US)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 15/279,714

(22) Filed: Sep. 29, 2016

(65) Prior Publication Data
US 2018/0086233 A1    Mar. 29, 2018

(51) Int. Cl.
*B60N 2/07*    (2006.01)
(52) U.S. Cl.
CPC ......... *B60N 2/0727* (2013.01); *B60N 2/0705* (2013.01); *B60N 2/0715* (2013.01); *B60N 2/0722* (2013.01)
(58) Field of Classification Search
CPC .. B60N 2/0727; B60N 2/0705; B60N 2/0722; B60N 2/07; F16C 29/046; F16C 33/46
USPC ........... 384/51, 48, 494; 312/334.17–334.18, 312/334–13; 248/430
See application file for complete search history.

(56) References Cited

U.S. PATENT DOCUMENTS 956,588 A * 5/1910 Lockwood .............. F16C 25/06
384/494

4,199,200 A * 4/1980 Livingston ........... A47B 88/407
312/334.18
8,172,192 B2   5/2012 Hofmann et al.
8,277,003 B2 * 10/2012 Milligan .............. A47B 88/493
312/334.33
9,108,533 B2   8/2015 Suck et al.
9,784,314 B2 * 10/2017 Ng ......................... F16C 29/005
(Continued)

FOREIGN PATENT DOCUMENTS

DE        19812045      9/1999
DE       202006016650   4/2008
WO        2006106044   10/2006

OTHER PUBLICATIONS

U.S. Appl. No. 14/754,841 "Adjusting device for longitudinal adjustment of a vehicle seat and method for assembly", filed Jun. 30, 2015.

*Primary Examiner* — Christopher Garft
(74) *Attorney, Agent, or Firm* — Renner, Otto, Boisselle & Sklar, LLP

(57) ABSTRACT

An adjusting device for longitudinal adjustment of a vehicle seat comprises a first rail 2 and a second rail 1 movably guided relative to the first rail 2. A linear guide 5 extending in the longitudinal direction is disposed between the two rails 1, 2 in a bearing area, wherein the linear guide 5 comprises a retainer 6 and a plurality of rolling elements 70, 71. The retainer 6 comprises a side wall 60, a plurality of recesses 66 being formed in the side wall 60. The rolling elements 70, 71 are supported in the recesses 66 of the retainer 6 spaced apart from each other in the longitudinal direction. According to the invention the rolling elements include a set of rolling elements consisting of at least one roller 71 and at least one ball 70.

28 Claims, 16 Drawing Sheets

(56) References Cited

U.S. PATENT DOCUMENTS

| | | | |
|---|---|---|---|
| 2007/0053624 A1* | 3/2007 | Schoder | F16C 19/49 384/494 |
| 2009/0238503 A1* | 9/2009 | Liang | A47B 88/493 384/18 |
| 2013/0075571 A1* | 3/2013 | Suck | B60N 2/072 248/430 |
| 2013/0076221 A1* | 3/2013 | Hammerle | F16C 33/34 312/334.1 |
| 2013/0266248 A1* | 10/2013 | Wolf | F16C 19/49 384/452 |
| 2014/0241651 A1* | 8/2014 | Greussing | A47B 88/487 384/19 |
| 2016/0128472 A1* | 5/2016 | Ng | F16C 29/005 384/18 |
| 2017/0001542 A1* | 1/2017 | Loppolo | B60N 2/0727 |

\* cited by examiner

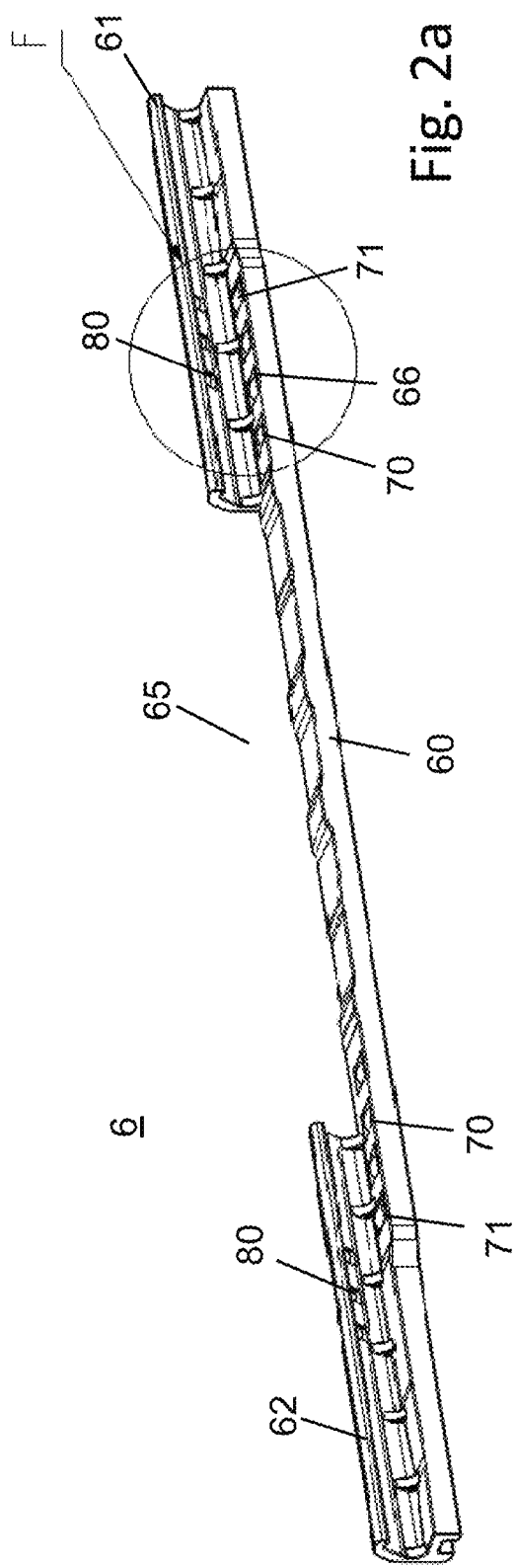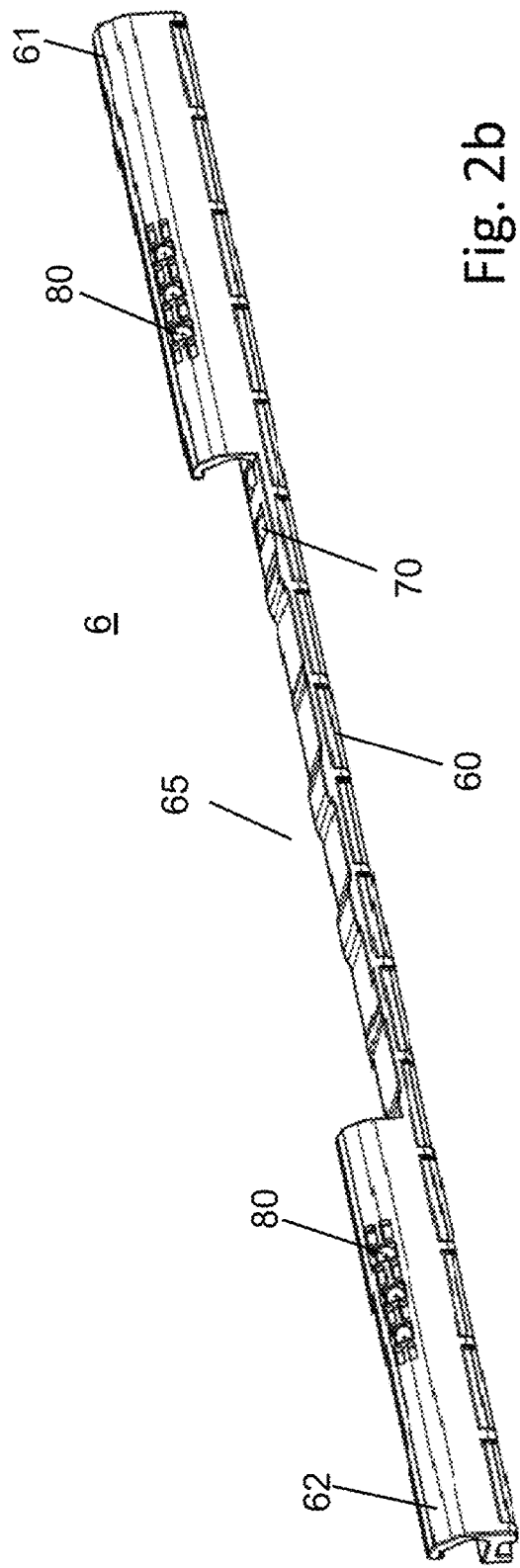

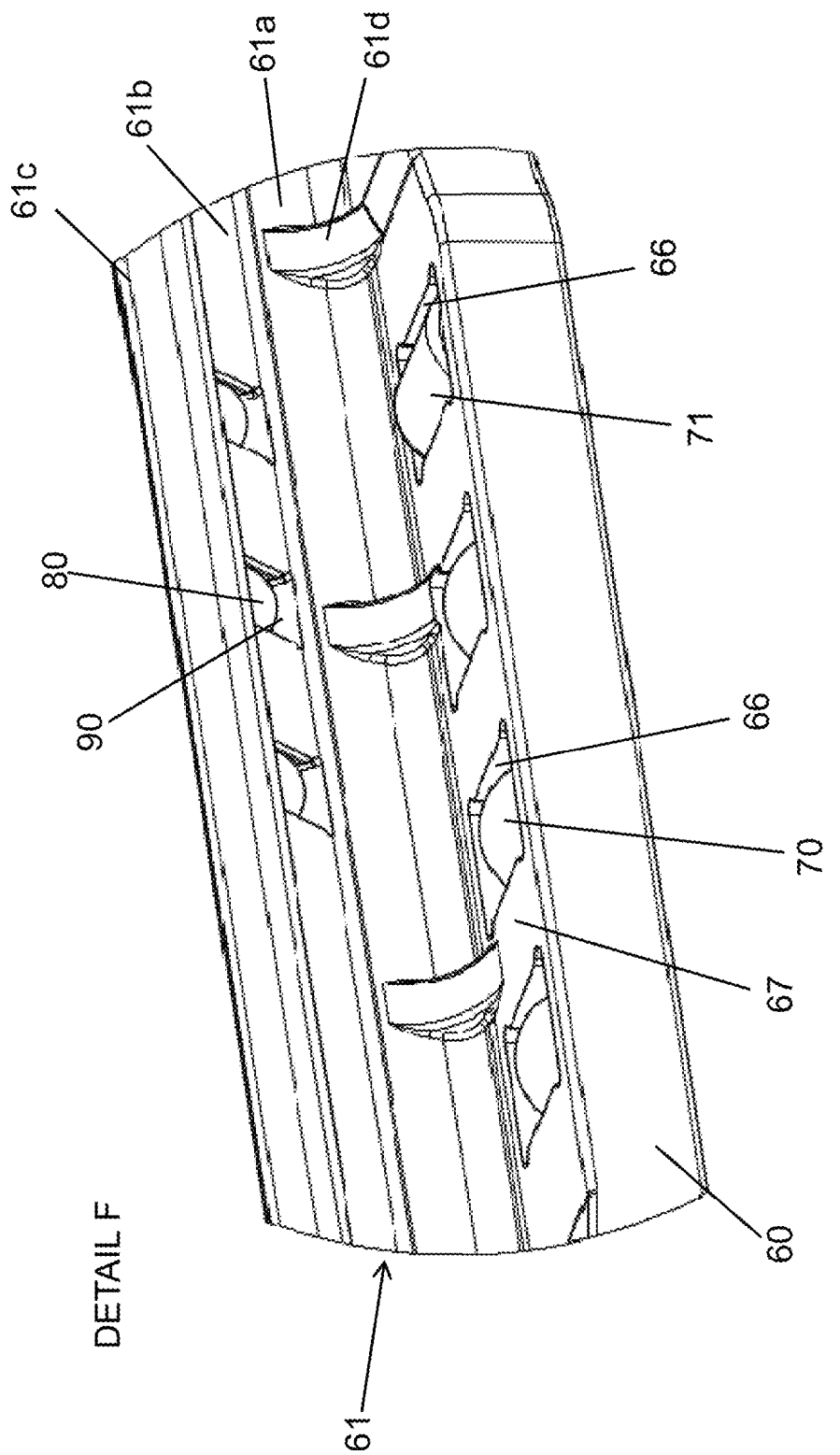

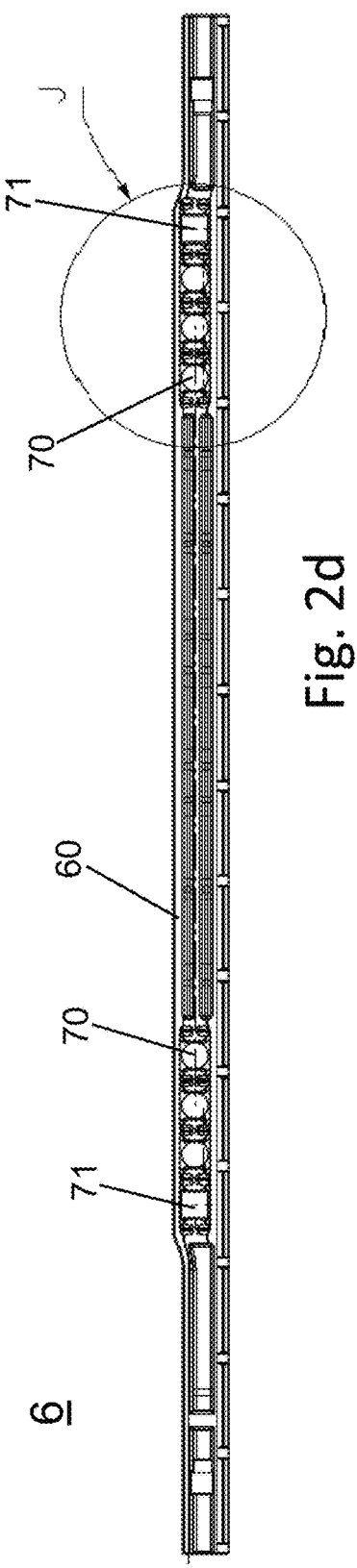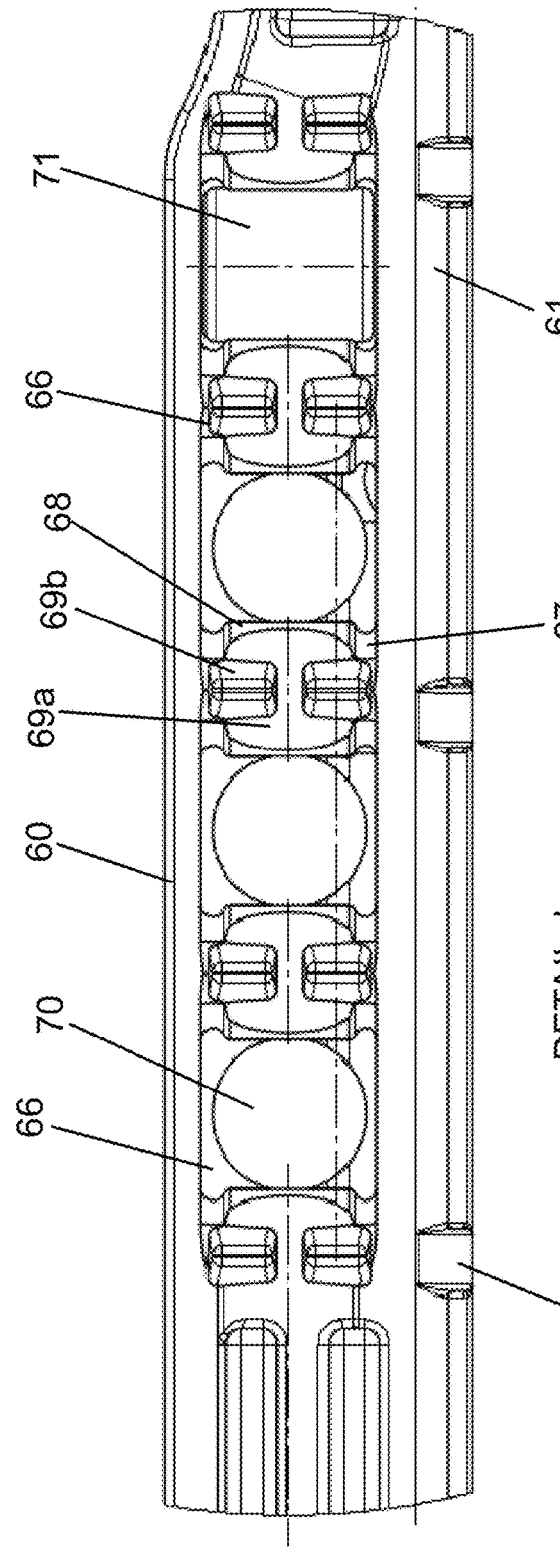

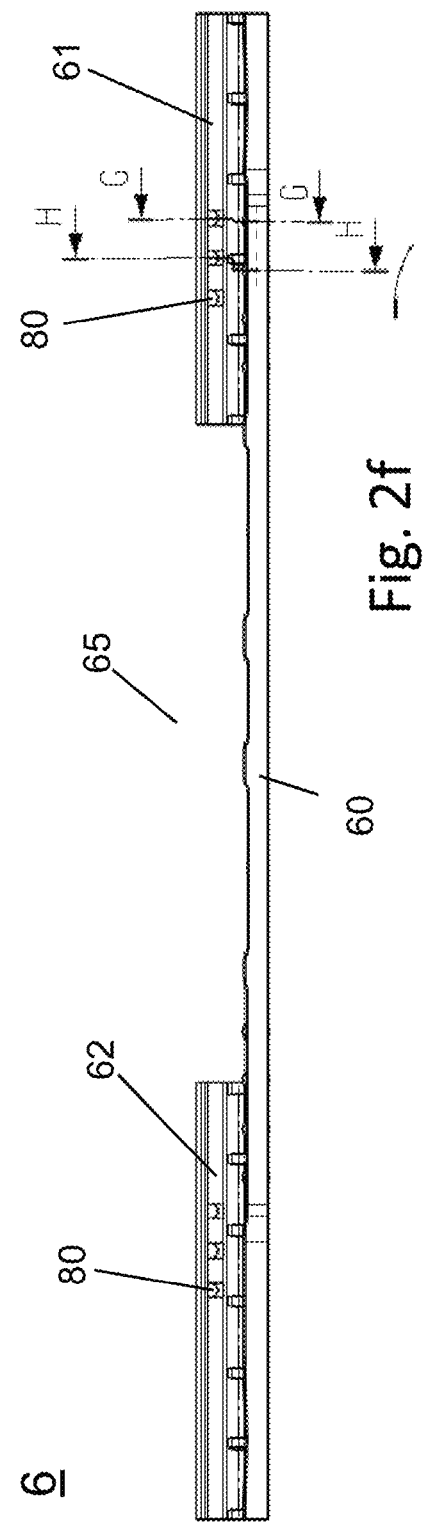

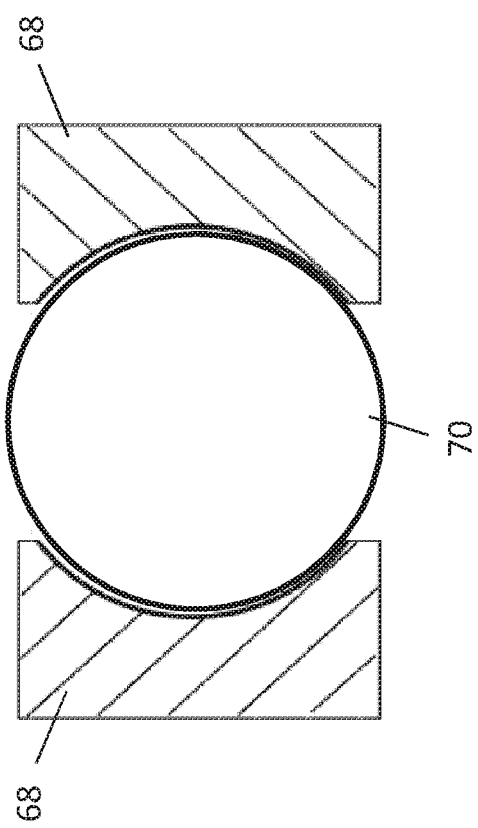

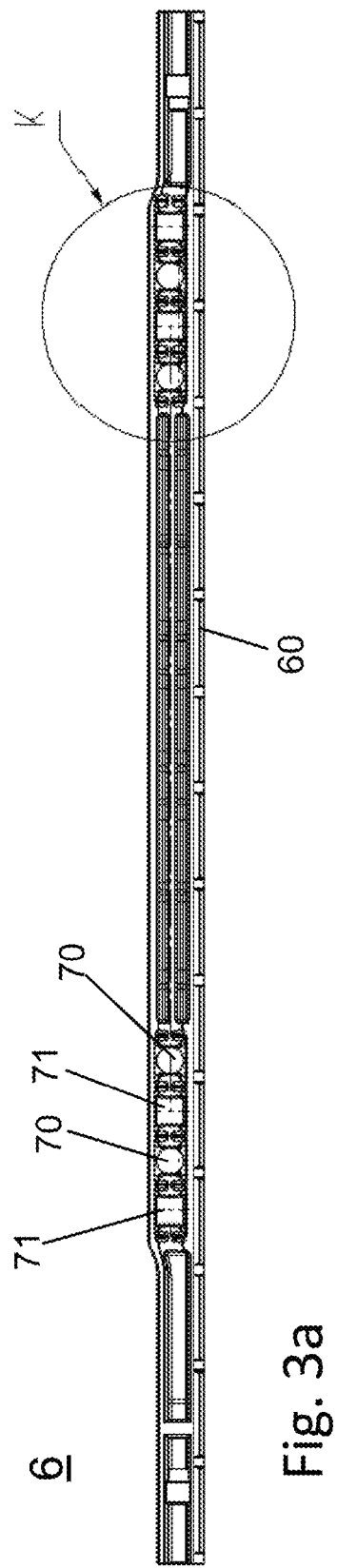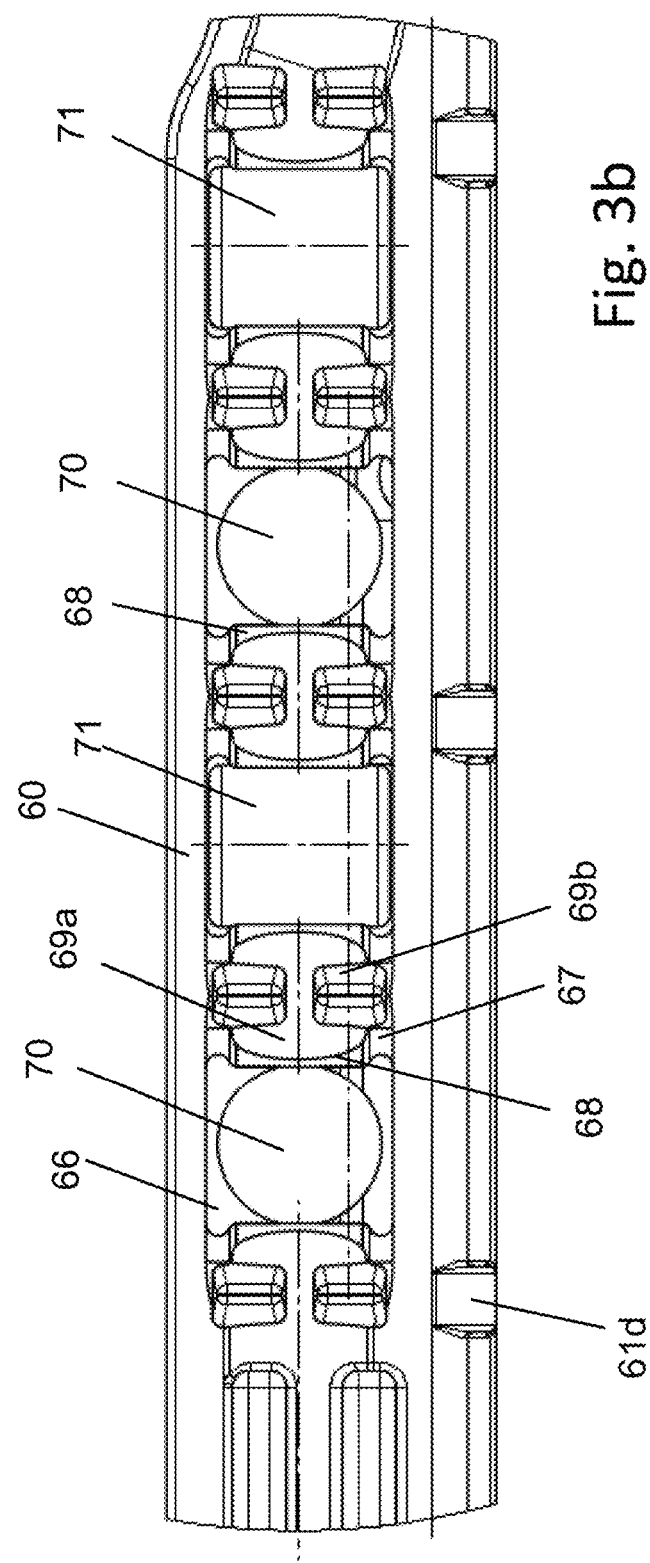
Fig. 3a
Fig. 3b

O - O

P - P

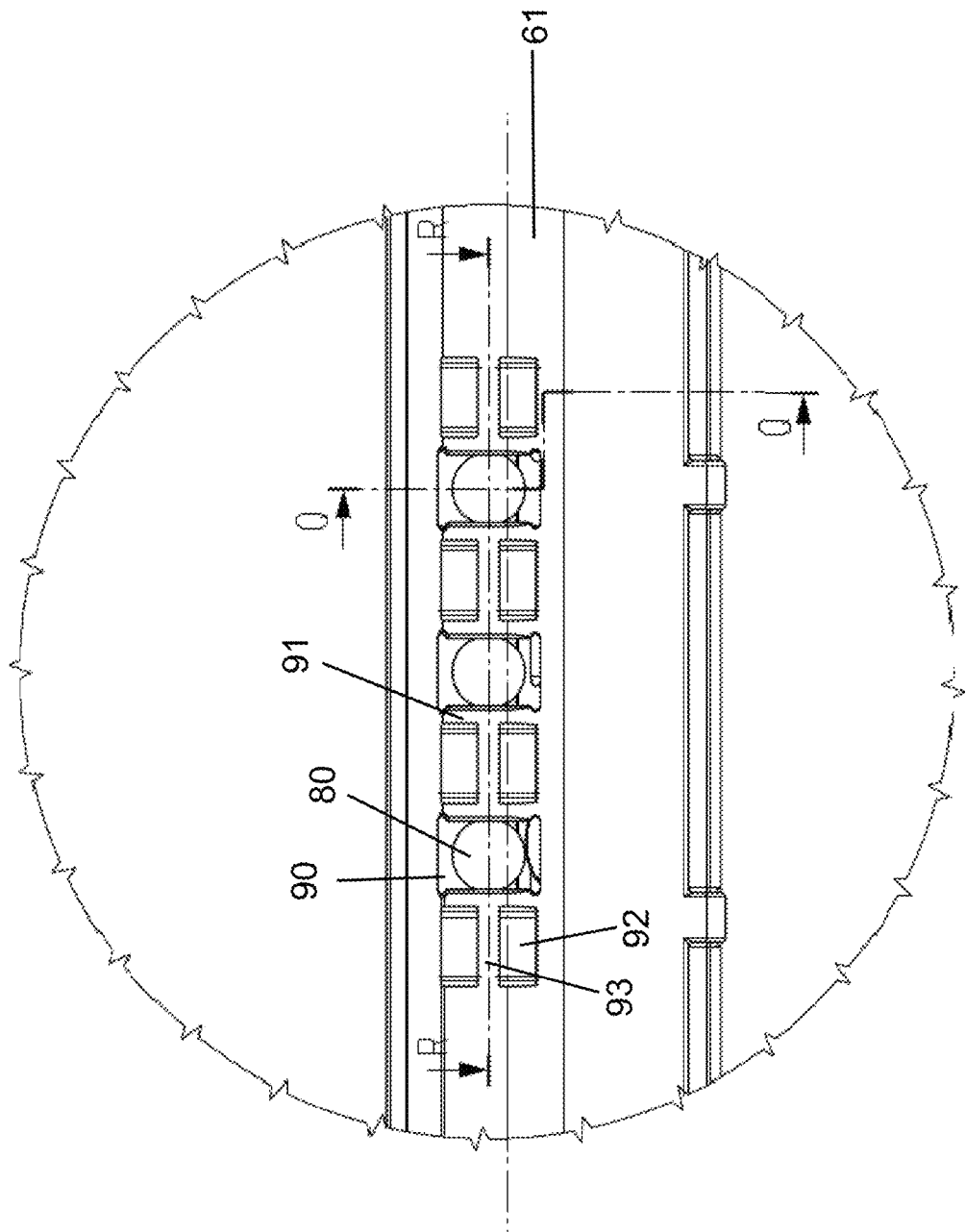

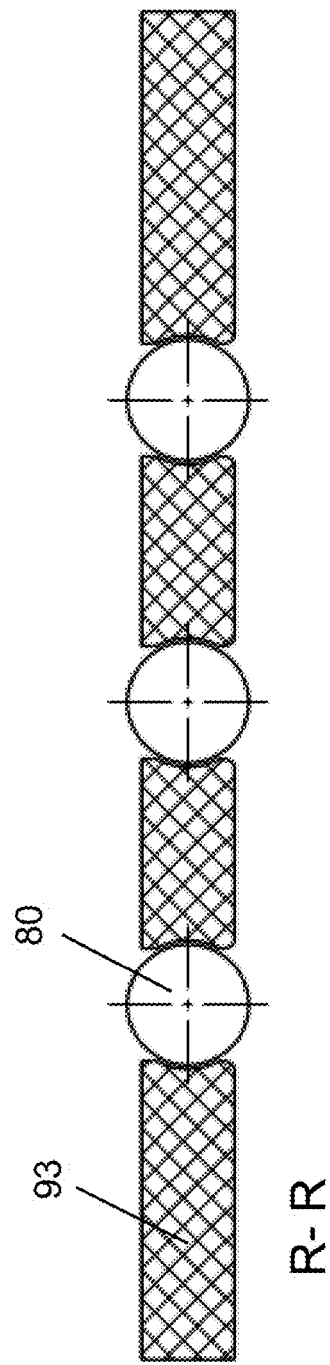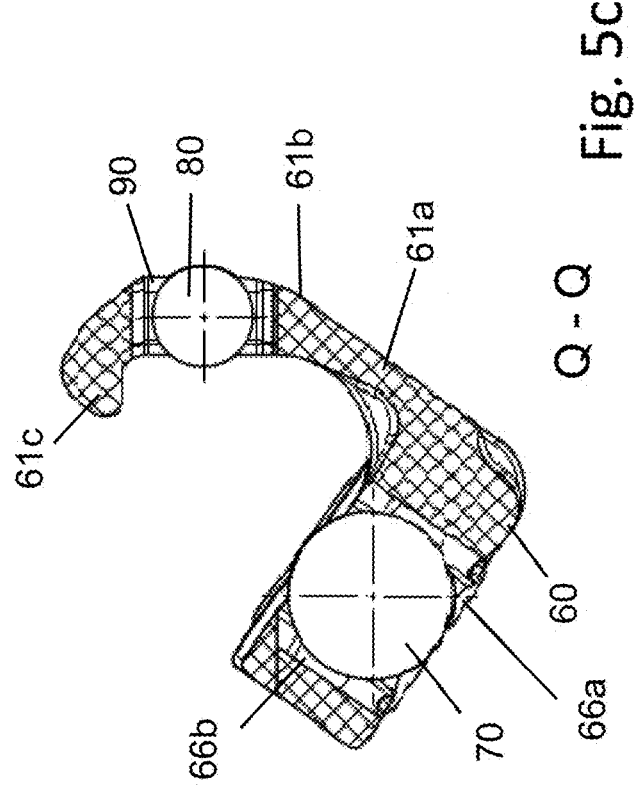

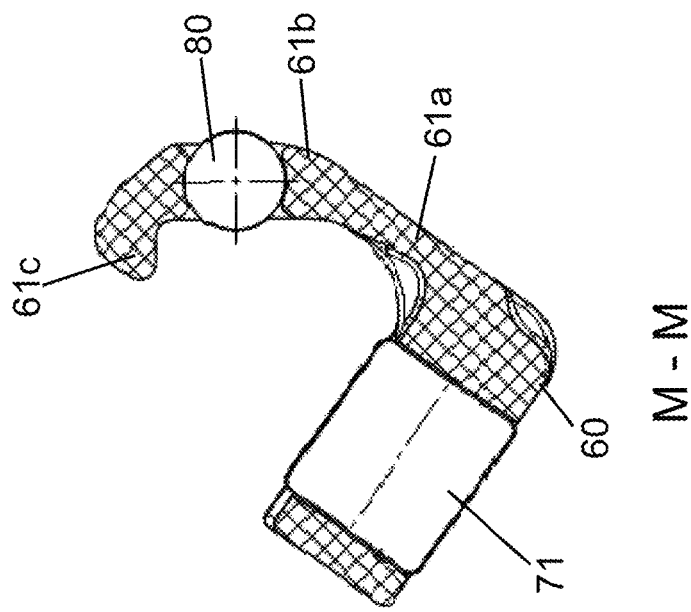
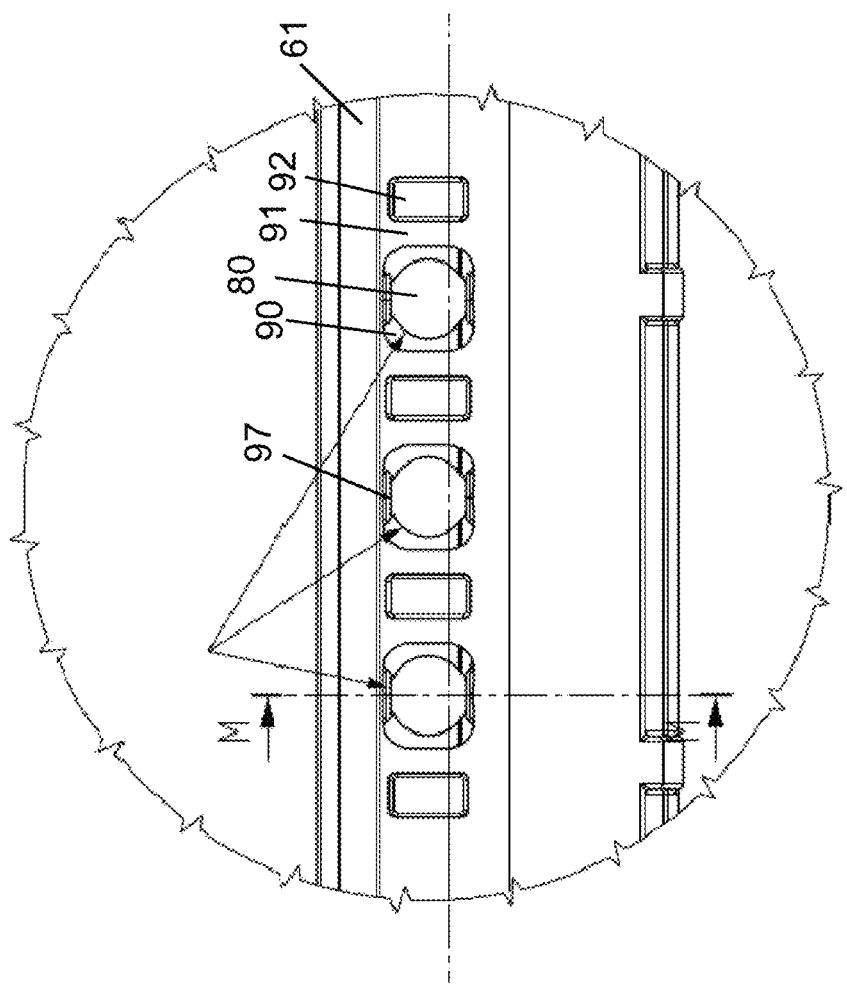

ADJUSTING DEVICE FOR LONGITUDINAL ADJUSTMENT OF A VEHICLE SEAT AND RETAINER FOR USE IN SUCH AN ADJUSTING DEVICE

FIELD OF INVENTION

The present invention relates to an adjusting device for longitudinal adjustment of a vehicle seat, particularly of a motor vehicle seat, and to a retainer for use in such an adjusting device.

BACKGROUND

Such a longitudinal adjusting device comprises at least a fixed lower rail and an upper rail that is adjustable and guided in the longitudinal direction along the lower rail. Between the upper rail and the lower rail at least one linear guide for the longitudinal guidance and support of the upper rail is disposed. Usually, in such a longitudinal adjustment device two lower rails are disposed in parallel with each other in the longitudinal direction of the motor vehicle, while the motor vehicle seat is mounted to the corresponding upper rails that are adjustable and guided in the longitudinal direction along the lower rails and can be secured in their positions with respect to the lower rails.

In DE 198 12 045 A1 discloses such an adjusting device for longitudinal adjustment of a motor vehicle seat. In this longitudinal adjusting device the upper rail and the lower rail are each designed essentially as U-shaped profiles. Between the upper rail and the lower rail two bearing areas are formed, in each of which a respective linear guide is disposed. The first linear guide disposed in the first bearing area is designed for receiving forces, which act substantially in vertical direction and result from the weight of the motor vehicle seat and a load, whereas the second linear guide disposed in the second bearing area is designed for receiving forces, which act substantially in horizontal direction and also result from the weight of the motor vehicle seat and a load. The second bearing area is a substantially cylindrical hollow space in which a plurality of ball bearings are disposed acting as a linear guide. The first bearing area is formed by two substantially rectangular hollow spaces in which a plurality of rollers are disposed acting as a linear guide.

Conventional adjusting devices as outlined above will use fixed number of either balls or rollers in a respective linear guide, but do not mix them. Balls and rollers that are used as rolling elements in the prior art both have their own benefits and weaknesses. For example ball only sets are subject to brinelling of the balls or denting of the rails (the raceway of the track sliding system) and high wear, particularly when the adjusting device is adjusted to a position near a foremost or rearmost end position of the upper rails. However balls also present the lowest sliding resistance and thus lower track efforts in the seat system. On the other hand, roller only sets provide higher surface area and therefore reduced wear and brinelling but have increased rolling resistance in the application.

In the prior art, a set of rolling elements consisting either of a plurality of rollers or of a plurality of balls is usually accommodated and supported in a retainer so as to be spaced apart from each other, wherein the retainer serves as a bearing cage for reducing friction between the two rails and ensuring a comfortable, noise-free and rattle-free adjustment of the upper rail relative to the lower rail by preventing a direct contact between adjacent rolling elements. FIG. 1 shows an example of such a conventional retainer 106 for supporting a plurality of rollers 171, as disclosed in co-pending U.S. patent application Ser. No. 14/754,841 of the Applicant "Adjusting device for longitudinal adjustment of a vehicle seat and method for assembly", filed on Jun. 30, 2016.

Referring to FIGS. 1a to 1c, retainer 106 is an oblong structure and comprises an oblong, rectangular bottom 160, in which a plurality of apertures or recesses 166, 167 for accommodating rollers 171, 172 is formed. The retainer 106 further comprises a rear side wall 161 and a front side wall 162, each extending substantially perpendicular to the bottom 160. In profile, the oblong retainer 106 is substantially L-shaped, wherein in use the oblong bottom 160 is disposed in a gap between two opposite, parallel bearing legs of the upper and lower rail, whereas the side walls 161, 162 are mated to the shape of a gap between two other opposite, parallel bearing legs of the upper and lower rail. A rectangular recess or window 165 is formed between the rear side wall 161 and front side wall 162 of retainer 106.

As shown in FIG. 1b, the recesses 166 supporting the rollers 171 are formed in the bottom 160 of retainer 106. The recesses 167 supporting the rollers 172 are formed in the rear side wall 161 and front side wall 162 (not shown) of retainer 106. The recesses 166, 167 and the rollers 171, 172 accommodated in these recesses 166, 167 are spaced apart from each other at equidistant spacing in the longitudinal direction of retainer 106. Side walls of the recesses 166, 167 extending perpendicular to the longitudinal direction of the rail (not shown) have concavely curved surfaces so that the rollers 171, 172 are snuggly accommodated in the recesses 166, 167. FIG. 1c shown the retainer of FIG. 1a in a cross-sectional view.

As shown in FIGS. 1a and 1b, only rollers 171, 172 are accommodated and supported in the recesses 166, 167 of the retainer 106. In other conventional retainers only balls are accommodated and supported in the recesses of the retainer.

In the market, there exists the need for adjusting devices for longitudinal adjustment of a vehicle seat which are as light-weight as possible, which nevertheless are stable enough to offer sufficient reliability in daily use and security in extreme situations and can be adjusted conveniently with proper adjusting forces and at reduced wear.

SUMMARY OF INVENTION

According to the present invention there is provided an adjusting device for longitudinal adjustment of a vehicle seat, particularly of a motor vehicle seat, comprising: a first rail and a second rail, which is movably guided in a longitudinal direction relative to the first rail, and a linear guide extending in the longitudinal direction and disposed between the first rail and the second rail in a bearing area, wherein the linear guide comprises a retainer and a plurality of rolling elements; the retainer comprises a side wall, a plurality of recesses being formed in the side wall; the rolling elements are supported in the recesses of the retainer spaced apart from each other in the longitudinal direction; and the rolling elements include a set of rolling elements consisting of at least one roller and at least one ball.

According to the present invention two different types of rolling elements, namely a proper mixture of rollers and balls, are supported in the same gap between two respectively opposite bearing legs of the upper and lower rail of the adjusting device. In other words, according to the present invention the retainer accommodating the rolling elements is of a hybrid cage design incorporating a mixture of rollers and balls supported at the same bearing area of the rail profile. Thus, the design of the adjusting device according to the present invention may take benefit from the inherent advantages of both rollers and balls while mitigating their respective weaknesses.

Based on the specific design needs of the adjusting device, according to the invention the rollers and balls can be positioned at proper longitudinal positions in the bearing area to offer sufficient reliability in daily use and security in extreme situations while ensuring a convenient adjustment with proper adjusting forces and at reduced wear. As an example, according to the present invention the rollers may be positioned at positions in the bearing area where the highest loads are to be expected in use, whereas the balls may be positioned at the other positions in the bearing area to provide the bulk of the bearing system. The number of balls and rollers and their location in respect to one another may be application dependant and might involve that not all of the recesses of the retainer accommodate bearing elements, rather that some of the recesses even may be empty.

According to the present invention this variability allows for the smoothest and lowest sliding efforts from a ball system while using the rollers to 'protect' the balls and raceway, particularly from brinelling. The number of balls and rollers and their location in respect to one another would be application dependant.

According to the present invention the specific positions of the rollers and balls may be varied even during assembly of the adjusting device, in accordance with the specific design needs of the adjusting device to be assembled. Thus, according to the present invention the same retainer may be used even for different designs and practical uses of the adjusting device.

Preferably the set of rolling elements accommodated and supported in the recesses on the same side of the retainer comprise more than two rolling elements. Preferably, two sets of rolling elements, each consisting preferably of the same number of rolling elements, are provided along the longitudinal direction of the retainer, namely a first set of rolling elements near a front end of the retainer and a second set of rolling elements near a rear end of the retainer. For each set of rolling elements, the number of balls and rollers and their location in respect to one another may be application dependant.

Preferably, the first rail is the lower rail of the adjusting device and is fixed to the bottom of the passenger compartment of the vehicle, whereas the second rail is the upper rail of the adjusting device fixedly connected with the bottom of the vehicle seat to be supported. Both the upper rail and the lower rail have a predetermined total length and can be used for the longitudinal adjustment over their entire length. End stop members are provided to properly delimit the total travel range of the adjusting device.

According to a further embodiment the recesses of the retainer are delimited by side walls extending perpendicular to the longitudinal direction, wherein the side walls have concavely curved surfaces so that the rolling elements can be snuggly accommodated in the recesses, specifically in two opposite curved receptacles formed by two opposite concavely curved surfaces.

According to a preferred embodiment the radii of curvature of the concavely curved surfaces of the side walls of the recesses are identical. Furthermore, the outer diameters of the rollers and balls to be accommodated and supported in the recesses of the retainer are identical and correspond to the radii of curvature of the concavely curved surfaces of the side walls of the recesses, so that the recesses are configured for optionally supporting rollers or balls. In other words, the individual recesses are fully compatible to accommodate either rollers or balls of the same outer diameter, in accordance with the specifications of the adjusting device to be assembled. Rollers and balls can be freely interchanged, e.g. at the stage of assembly of the adjusting device.

According to a further embodiment, the side walls of the recesses are formed by distance members having the same length so that the recesses are spaced apart from each other at equidistant spacing. The distance members may be formed integral with the respective surface of the retainer, but may also be formed as separate members to be inserted together with the suitable rolling elements into a longitudinal groove or aperture of the retainer. The equidistant spacing particularly enables an exact design of the adjusting device, particularly a numerical simulation of the forces to be expected in daily use.

According to a further embodiment, the side walls of the distance members are interconnected by longitudinal webs extending in the longitudinal direction of the rail and perpendicularly to the side walls. This design helps to reduce the total production costs due to the integral design. In such an embodiment, a certain resiliency of the distance members in the longitudinal direction may be provided, e.g. by providing additional recesses in these longitudinal webs, which can be of advantage particularly when inserting the rolling elements into the recesses during assembly of the adjusting device.

According to a further alternative embodiment, the side walls of the distance members are interconnected by transverse webs extending perpendicularly to the side walls. This design enables a certain resiliency of the distance members in the longitudinal direction, which can be of advantage particularly when inserting the rolling elements into the recesses during assembly of the adjusting device.

According to a further embodiment, the set of rolling elements comprises a single roller and a plurality of balls, which may include the situation that some of the recesses of the retainer are empty and do not accommodate any rolling elements. Usually, the fewer the rollers, the smoother and with lower resistance the adjusting device may be adjusted. In such a design, the single roller would preferably be positioned at a position where the highest loads are to be expected in use, whereas the balls may be positioned at the remaining positions in the bearing area to provide the bulk of the bearing system. Thus, according to a preferred embodiment the single roller may be accommodated and supported in a foremost recess of the plurality of recesses or in a rearmost recess of the plurality of recesses of the retainer, because the highest loads, resulting from the weight of the passenger seated on the motor vehicle seat or from forces caused by a sudden deceleration of the motor vehicle or by a crash situation, may be expected when the upper rail is moved to a foremost or to a rearmost position with respect to the lower rail.

According to an alternative further embodiment, the set of rolling elements comprises two rollers and a plurality of balls, which may include the situation that some of the recesses of the retainer are empty and do not accommodate any rolling elements. In such a design, the two rollers would preferably be positioned at positions where the highest loads are to be expected in use, whereas the balls may be positioned at the remaining positions in the bearing area to provide the bulk of the bearing system. Thus, in this embodiment a first roller of the two rollers is preferably supported in a foremost recess of the plurality of recesses of the retainer and a second roller of the two rollers is preferably supported in a rearmost recess of the plurality of recesses of the retainer, for the same reasons as set forth in the previous paragraph.

According to a further embodiment, the set of rolling elements may comprise a plurality of rollers and a plurality of balls supported in the recesses of the retainer in an alternating sequence if viewed in the longitudinal direction.

According to a further embodiment, the retainer comprises a bottom side wall and an upper side wall extending substantially perpendicularly to the bottom side wall. The bottom side wall is preferably plane, corresponding to the rail profile at the bottom legs of the upper and lower rail or comprises a plurality of protrusions of the same height which together span a common plane. The upper side wall may be partially curved or folded inward, particularly near an upper edge thereof, corresponding to the specific rail profile in this region, as outlined below in more detail.

According to a further embodiment, the recesses are formed only in the bottom side wall of the retainer, to accommodate and support at least one roller and a plurality of balls acting as rolling elements for absorbing forces acting substantially in the vertical (downward) direction.

According to a further embodiment, additional recesses are formed also in the upper side wall of the retainer for absorbing force components traverse to the forces acting substantially in the vertical (downward) direction. Such force components may be caused by the specific geometry of the rail profile, particularly by slanted bearing legs extending under an acute angle relative to the base legs of the upper and lower rail, and help to further reduce the loads acting in vertical (downward) direction. Accordingly, in such an embodiment the recesses comprise a plurality of first recesses formed in the bottom side wall of the retainer and a plurality of second recesses formed in the upper side wall of the retainer.

According to a further preferred embodiment, the upper side wall comprises a base extending substantially perpendicular to the bottom side wall of the retainer, a slanted side wall connected with the base extending under an acute angle inward relative to the base and a front end forming a free end of the slanted side wall, wherein the plurality of second recesses is formed in the slanted side wall of the upper side wall. The base serves for interconnection between the bottom side wall and the slanted side wall and may be further stiffened by a plurality of stiffening webs to fix the angle included between the bottom side wall and the slanted side wall. This angle corresponds exactly to the angle that is included between the above-mentioned slanted bearing legs extending under an acute angle relative to the base legs of the upper and lower rail. In such an embodiment, loads acting both in vertical and horizontal direction may be absorbed more efficiently.

According to a further embodiment, the at least one ball of the set of rolling elements is supported with play in a direction perpendicular to the longitudinal direction in a respective one of the recesses of the retainer. This allows the at least one ball of the set of rolling elements a little freedom to find their "best fit" position in actual use, and also prevents that the ball(s) roll(s) always along the same track in longitudinal direction, thus ensuring a convenient adjustment with proper adjusting forces and at reduced wear.

According to a further embodiment, the set of rolling elements comprises a plurality of balls supported in the recesses formed in the bottom side wall and/or in the upper side wall of the retainer, wherein the recesses formed in the same side wall of the retainer are offset relative to each other in a direction perpendicular to the longitudinal direction in alternating sequence. This enables that the balls do not roll in the same track in actual use but rather in two separate, independent tracks. If combined with the previous features that the balls are accommodated with play in a direction perpendicular to the longitudinal direction in the recesses of the retainer, this helps to ensure an even more convenient adjustment with proper adjusting forces and at reduced wear.

According to a further preferred embodiment, the retainer is formed of a plastic material or a resin so that the retainer may be formed at low costs. Particularly, the material of the retainer enables a certain degree of resiliency so that the rolling elements can be inserted more easily into the recesses during assembly of the adjusting device.

According to a related aspect of the present invention, there is provided a retainer for supporting a plurality of rolling elements, for use in an adjusting device for longitudinal adjustment of a vehicle seat as set forth in the present application, the retainer comprising a side wall having a plurality of recesses formed in the side wall, wherein the rolling elements are supported or can be supported in the recesses of the retainer spaced apart from each other in a longitudinal direction of the retainer, and the rolling elements include a set of rolling elements consisting of at least one roller and at least one ball.

OVERVIEW ON DRAWINGS

Hereinafter, the invention will be described with reference to preferred exemplary embodiments and with reference to the drawings, wherein:

FIGS. 2a and 2b show a retainer for an adjusting device for longitudinal adjustment of a vehicle seat according to the present invention in a perspective side view and perspective rear view;

FIG. 2c shows detail F of FIG. 2a in an enlarged perspective top view;

FIG. 2d shows a retainer according to a further embodiment of the present invention in a bottom view;

FIG. 2e shows detail J of FIG. 2e in an enlarged perspective bottom view;

FIG. 2f shows the retainer of FIG. 2a in a rear view;

FIG. 2i is a cross-sectional view of the side walls of a recess depicting concavely curved surfaces that snugly accommodate a ball.

FIGS. 3a and 3b show a retainer according to a further embodiment of the present invention in a bottom view and an enlarged bottom view (detail K);

FIGS. 4b and 4c show a cross-sectional view along P-P and O-O of the retainer of FIG. 4a;

FIG. 5a shows a partial plan view of the upper side wall of a retainer according to a further embodiment of the present invention;

FIGS. 5b and 5c show a cross-sectional view along R-R and Q-Q of the retainer of FIG. 5a;

Figure 6B:
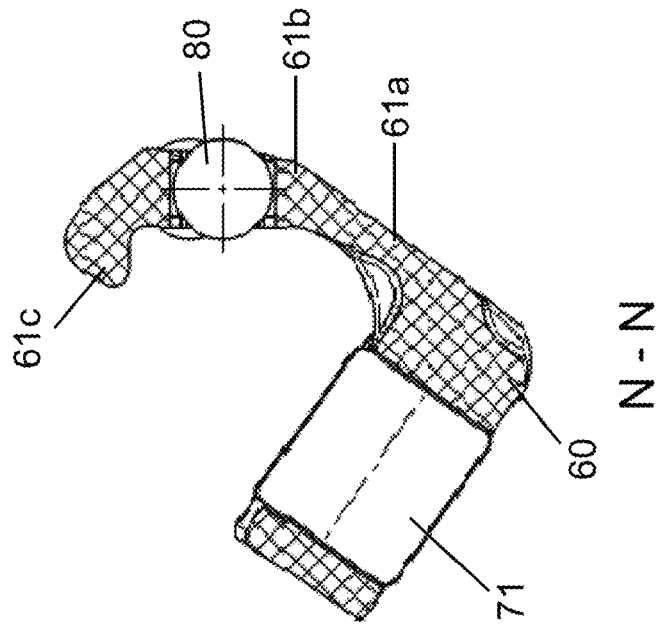
FIG. 6a shows a partial plan view of the upper side wall of a retainer according to a further embodiment of the present invention.
Figure 6A:
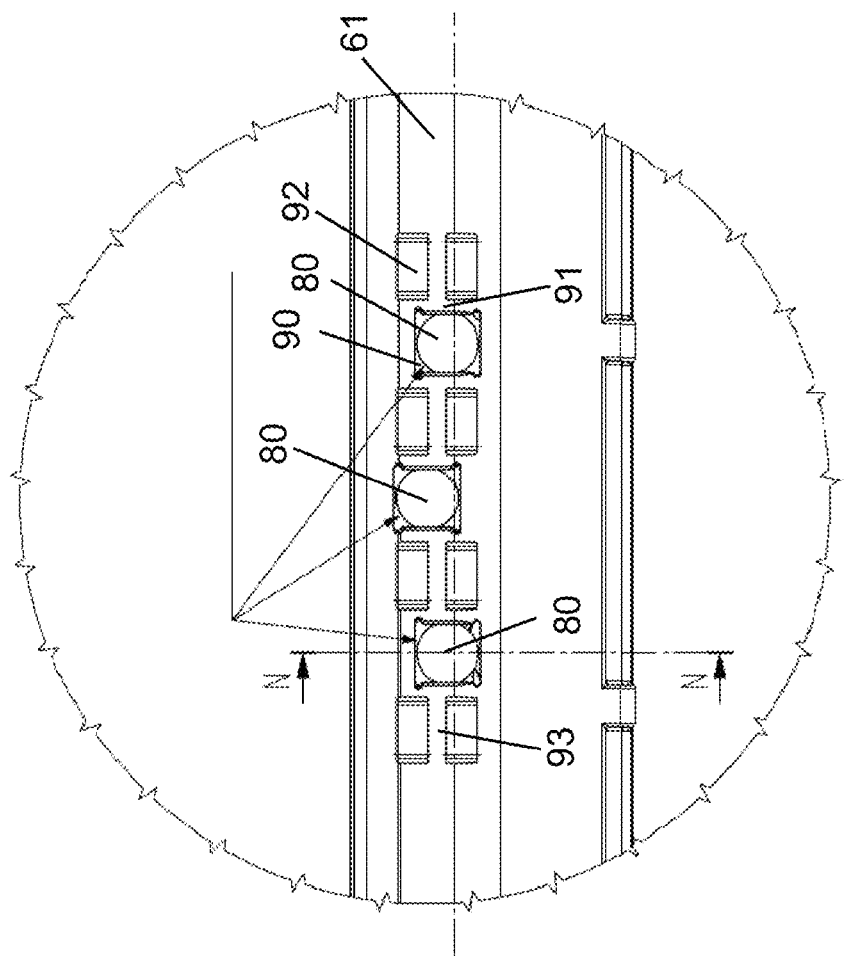
Figure 8:
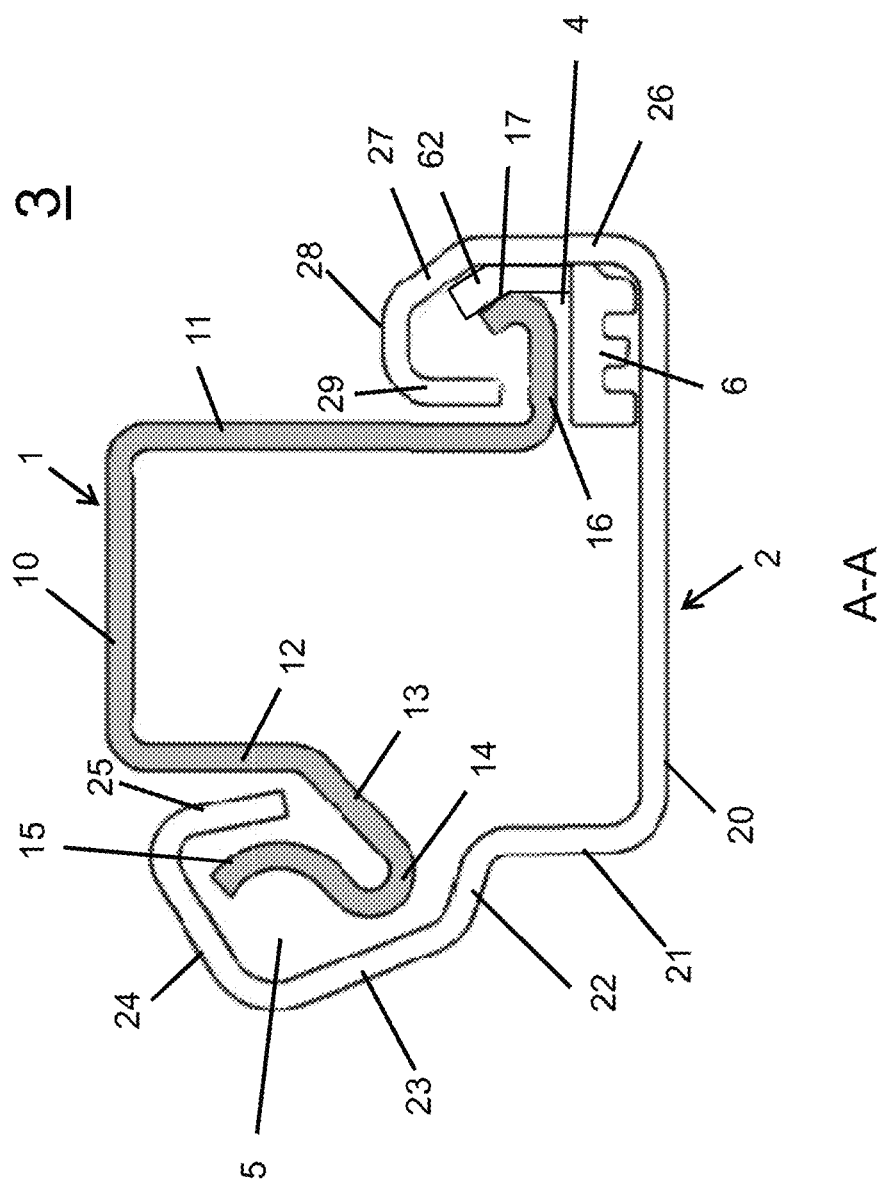

FIG. 6*b* shows a cross-sectional view along N-N of the retainer of FIG. 6*a*;

FIG. 7*a* shows a partial plan view of the upper side wall of a retainer according to a further embodiment of the present invention;

FIG. 7*b* shows a cross-sectional view along M-M of the retainer of FIG. 7*a*; and FIG. 8 is a cross-sectional view of the slide rails of the adjusting device for longitudinal adjustment of a vehicle seat according to the present invention.

Throughout the drawings, like reference numerals designate identical or technically equivalent elements or groups of elements.

DETAILED DESCRIPTION OF PREFERRED EMBODIMENTS

Before details of the supporting of the rolling elements according to the present invention will be described, in the following the general geometry of an exemplary adjusting device for longitudinal adjustment of a vehicle seat will be described with reference to FIG. 8. It should be noted, however, that the following disclosure shall not be construed to be delimited only to the particular geometry of the adjusting device shown in FIG. 8.

As shown in FIG. 8, the adjusting device 3 for longitudinal adjustment of a vehicle seat has a substantially rectangular profile and consists of an upper rail 1 (second rail) mounted on lower rail 2 (first rail) so as to be displaceable in longitudinal direction along lower rail 2. As shown in FIG. 8, the upper rail 1 is substantially inverse U-shaped and comprises a horizontal base leg 10 (bottom) and an L-leg 11 projecting substantially perpendicularly from the base leg 10. The L-leg 11 is adjoined with a horizontal third connecting leg 16, which is followed by a bearing leg 17, which represents a second end portion of the upper rail 1 and extends under an acute angle upward and toward the interior of the upper rail 1. On the opposite side, a first connecting leg 12 extends substantially perpendicularly to the base leg 10 and in parallel with the opposite L-leg 11. The first connecting leg 12 is followed by a second connecting leg 13, which extends under an acute angle downward and toward the outer side of the upper rail 1. The second connecting leg 13 is followed by a bending portion 14 and a first end portion 15, which is semi-circularly curved in correspondence with the radius of curvature of steel balls (not shown) to be supported between the first end portion 15 and a corner region formed by the two opposite legs 23, 24 of upper rail 1.

As shown in FIG. 8, lower rail 2 is substantially U-shaped and comprises a horizontal base leg 20 (bottom) and an L-leg 21 projecting substantially perpendicularly and upward from the base leg 20. The L-leg 21 is adjoined with a slanted first connecting leg 22, which extends outwards from lower rail 2, preferably inclined upward, which is followed by a second connecting leg 23, which extends under an acute angle outwards and upwards relative to base leg 20, and a third connecting leg 24, which extends under an acute angle inwards and upwards relative to base leg 20, and is finally followed by the first end portion 25, which extends downward, toward base leg 20 and into the gap between the first connecting leg 12 of upper rail 1 and the opposite first end portion of upper rail 1. Steel balls (not shown) serving as bearing members are supported in linear guide 5 formed by the semi-circular curved end portion 15 of upper rail 1 and the opposite corner region between second connecting leg 23 and third connecting leg 24 of lower rail 2.

On the opposite side, a fourth connecting leg 26 extends substantially perpendicularly to the base leg 20 and in parallel with the opposite L-leg 21. The fourth connecting leg 26 is followed by a fifth connecting leg 27, which extends under an acute angle upward and toward the inner side of the lower rail 2. The fifth connecting leg 27 is followed by a sixth connecting leg 28, which extends in parallel with horizontal base leg 20 and inward, and by the second end portion 29, which extends downward toward base leg 20 and into the gap between the bearing leg 17 and L-leg 11 of upper rail 1.

Thus, the end portions 25, 29 of the lower rail 2 embrace the corresponding end portions 15, 17 of the upper rail 1. The bearing areas, which are formed by opposite portions 15, 23/24 and 17, 27 of the upper rail 1 and lower rail 2, respectively, are thus diagonally offset to each other and biased against each other. Thus, linear guides 4, 5 for accommodating and supporting rolling elements are formed at the end portions of upper and lower rail 1, 2. As shown in FIG. 8, the linear guide 4 at the right-hand side in FIG. 8 is of rectangular shape and thus configured to guide rollers and/or balls, whereas the linear guide 5 at the left-hand side in FIG. 8 is of cylindrical shape and thus configured to guide only balls.

As shown in FIG. 8, a retainer 6 for accommodating and supporting rolling elements is disposed between the two rails 1, 2 in the linear guide 4 on the right-hand side of FIG. 8, which is formed by respectively opposite, parallel legs of the two rails 1, 2, namely between the base leg 20 of lower rail 2 and opposite third connecting leg 16 of upper rail 1 and between the fourth and fifth connecting legs 26, 27 of lower rail 2 and opposite bearing leg 17 of upper rail 1.

More details of a retainer 6 (also referred to as bearing cage) according to the present invention are shown in FIGS. 2*a* to 2*c* in a perspective side view, a perspective rear view and an enlarged perspective top view.

As shown in FIGS. 2*a* and 2*b*, retainer 6 is an oblong structure, preferably of plastic material or resin, and comprises an oblong, rectangular bottom 60, in which a plurality of apertures or recesses 66 for optionally accommodating and supporting rollers or steel balls (not shown) is formed. The lower side of bottom 60 is substantially plane. Any webs projecting from the lower side of bottom 66, e.g. in the longitudinal recess 65 shown in FIGS. 2*a* and 2*b*, span a common plane. Thus, if no rolling elements should be accommodated in the recesses 66, the bottom 60 could be supported on an opposite bearing leg of the lower rail 2. Further, as shown in the enlarged partial view of FIG. 2*c*, also the upper side of bottom 66 is substantially plane. Any webs or protrusions projecting from the upper side of bottom 60, e.g. in the longitudinal recess 65 shown in FIGS. 2*a* and 2*b*, span a common plane. Thus, if no rolling elements should be accommodated in the recesses 66, the bottom 60 could be supported on an opposite bearing leg of the upper rail 1.

As shown in FIGS. 2*a* and 2*b*, in profile, the oblong retainer 6 is substantially L-shaped, and further comprises a rear side wall 61 and a front side wall 62, which at least partially project substantially perpendicular to the bottom 66. As shown in FIGS. 2*a* and 2*b*, the upper edge of the side walls 61, 62 is inclined inward, in correspondence with the particular geometry of the rail 3 (see FIG. 8). More specifically, as shown in FIG. 2*c*, the rear side wall 61 comprises a base 61*a* extending substantially perpendicular to the bottom 60 of the retainer, a slanted side wall 61*b* connected with the base 61*a* and extending under an acute angle inward relative to the base 60 and a front end 61*c* forming a free end of the slanted side wall 61*b*. A plurality of second recesses 90 is formed in the slanted side wall of the slanted side wall 61*b*. The angle included between the bottom 60 of retainer and the slanted side wall 61*b* corresponds to the angle included between the third connecting leg 16 (see FIG. 8) of lower rail 2 and the third connecting leg 17 of lower rail 2. Further, the front end 61*c* of retainer 6 may embrace the free end of third connecting leg 17 and thus may extend into the gap between the second end portion 29 of upper rail and the third connecting leg 17 to prevent a direct contact in this bearing area. As shown in FIG. 2*c*, stiffening webs 61*d* may be provided at the bottom of base 61*a* to retain the angle included between the bottom 60 and base 61*a* of the retainer, in accordance with the angle included between the base leg 20 of lower profile (see FIG. 8) and the fourth connecting leg 26 of lower rail 2.

As shown schematically in FIG. 8, in use the oblong bottom 60 of retainer 6 is disposed in the gap between base leg 20 of lower rail 2 and the third connecting leg 16 of upper rail 1, whereas the side walls 61, 62 are mated to the shape of the gap between the upright fourth connecting leg 26 of lower rail 2 and opposite curved bottom edge of bearing leg 17 of upper rail 1 and to the shape of the gap between the slanted fifth connecting leg 27 of lower rail 2 and the slanted front end of bearing leg 17.

As shown in FIGS. 2*a* and 2*b*, a rectangular recess or window 65 is formed in longitudinal direction between the rear side wall 61 and front side wall 62 of retainer 6. In general, this longitudinal recess 65 may also be omitted or may not extend over the entire height of side walls 61, 62 of the retainer 6.

If this longitudinal recess 65 is provided, it may cooperate with an end stop additionally disposed in the gap between upper and lower rail 1, 2 and extending both through a recess formed e.g. in bearing leg 17 of upper rail 1 and through the longitudinal recess 65 of retainer 6, as disclosed particularly in the context of the cross-sectional view of FIG. 5*b* of co-pending U.S. patent application Ser. No. 14/754,841 of the Applicant "Adjusting device for longitudinal adjustment of a vehicle seat and method for assembly", filed on Jun. 30, 2016, the whole content of which is hereby expressly incorporated by reference for disclosure purposes. As disclosed in co-pending U.S. patent application Ser. No. 14/754,841 of the Applicant, by cooperation of the additional end stop with the edges of recess of bearing leg 17 and the edges of longitudinal recess 65 of retainer 6, the most forward and most backward position of upper rail 1 relative to lower rail 2 can be defined.

If the longitudinal recess 65 is not provided, the most forward and most backward position of upper rail 1 relative to lower rail 2 may also be defined in a conventional manner.

As shown in FIG. 2*c*, the recesses 66 in bottom 60 of retainer 6 are basically of rectangular shape, wherein the height of bottom 60 in a direction perpendicular to the longitudinal direction is slightly less than the outer diameter of the rollers 71 or balls 70 to be accommodated and supported in these recesses 66. Thus, in use the surfaces of the rollers 71 or balls 70 extend slightly beyond the upper surface and bottom surface of bottom 60, as shown in FIG. 2, so that the rollers 71 or balls 70 will be in direct contact with the opposite base leg 20 of lower rail 2 and the third connecting leg 16 of upper rail 1 and the upper surface and bottom surface of bottom 60 are not in contact with the opposite base leg 20 of lower rail 2 and the third connecting leg 16 of upper rail 1 to reduce friction.

As shown in FIG. 2*c*, similar recesses 90 for accommodating and supporting rollers (not shown) and/or balls 80 may also be provided in the upper side wall 61 of retainer 6, particularly in the inwardly inclined portions 61*b* of rear side wall 61 and front side wall 62, to absorb force components in a direction different to the vertical direction, resulting e.g. from the resolution of the force caused by the inclined bearing leg 17 in the rail profile shown in FIG. 8.

According to the present invention, the rolling elements that are supported in the recesses 66 of the bottom 60 of retainer 6 (or additionally also in the recesses 90 of upper side wall of retainer 6 (see FIG. 2*c*)) include at least one set of rolling elements consisting of at least one roller 71 and at least one ball 70. More specifically, as shown in FIGS. 2*a* and 2*b*, a first set of rolling elements is accommodated in the recesses 66 in the bottom 60 near the rear side wall 61 and hence near the rear end of the retainer 6, while a second set of rolling elements is accommodated in the recesses 66 in the bottom 60 near the front side wall 62 and hence near the front end of the retainer 6.

As shown in FIG. 2*c*, each set of rolling elements includes a single roller 71 and three balls 70. The present invention shall, however, not be construed to be delimited to such a particular combination of rollers and balls. Different combinations of rollers and balls for each set of rolling elements may be considered as well and may be application dependant.

In the embodiment shown in FIGS. 2*a* and 2*b*, the two sets of rolling elements consist in total of two rollers 71 and six balls 70, wherein a first roller 71 is supported in a foremost recess 66 of the plurality of recesses 66 provided in the bottom 60 near the front side wall 62 and wherein a second roller 71 is supported in a rearmost recess 66 of the plurality of recesses 66 provided in the bottom 60 near the rear side wall 61. According to the present invention, in the foremost and rearmost position of the upper rail with respect to the lower rail vertical loads may thus be compensated efficiently and the raceway may thus be efficiently protected against brinelling due to high loads prevailing particularly in these extreme positions of the upper rail, caused particularly by the weight of the passenger seated on the motor vehicle seat or by forces caused resulting from a sudden deceleration of the motor vehicle or a crash situation.

According to a further embodiment (not shown) wherein no longitudinal recess 65 is provided in the retainer, of course, two sets of rolling elements as outlined above may also be provided directly near the foremost and rearmost end of retainer 6, instead of being provided near the edges of longitudinal recess 65, as shown in FIG. 2.

Of course, if such high loads may also be expected at other or additional positions, according to the invention additional rollers 71 may also be provided in the recesses 66 at such expected positions.

As shown in FIGS. 2*a* and 2*b*, the remaining recesses 66 accommodate and support (steel) balls 70 to further reduce friction and ensure a convenient longitudinal adjustment of the position of the vehicle seat.

Of course, the present invention also considers that not all of these remaining recesses 66 of the retainer 6 accommodate rolling elements, particularly that some of these remaining recesses 66 may be empty even. E.g. it is envisaged according to the present invention that, if the longitudinal adjustment of the position of the vehicle seat is to be performed fully manually, all or at least the vast majority of the recesses 66 of the retainer 6 accommodate rolling elements, whereas, if the longitudinal adjustment of the position of the vehicle seat is to be performed automatically by means of electric motors, at least some of the recesses 66 of the retainer 6 may be empty and do not accommodate any rolling elements, which may include even the extreme case that each set of rolling elements includes only a single roller and a single ball.

As shown in the enlarged partial view of FIG. 2c, the recesses 66 are delimited by side walls of distance members 67 each having the same length so that the recesses 66 and the balls 70 and rollers 71 accommodated in these recesses 66 are spaced apart from each other at equidistant spacing. The side walls 68 and transverse webs 67 extend perpendicular to the longitudinal direction of the rail and the side walls 68 have concavely curved surfaces, as shown in FIG. 2i, so that the balls 70 and rollers 71 are snuggly accommodated in the recesses 66, particularly in receptacles formed by two opposite concavely curved surfaces. The side walls 68 of the recesses 66 are interconnected by the transverse webs 67, which serve as distance members for defining the afore-mentioned spacing. These distance members are preferably made of a plastic material or resin. Preferably, the retainer 6 and the transverse webs 67 are formed as a single piece. In order to enable a certain resiliency of the transverse webs 67 in the longitudinal direction, the transverse webs 67 may be hollowed out partially, as set forth below in more detail, so that the balls 70 and rollers 71 can be easily inserted into the recesses 66 during assembly of the adjusting device at positions that may be application dependent.

The radii of curvature of the concavely curved surfaces of the side walls of the transverse webs 67 are preferably identical. Furthermore, the outer diameters of the rollers 71 and balls 70 to be accommodated and supported in the recesses 66 of the retainer 6 are preferably also identical and in accordance with the radii of curvature of the concavely curved surfaces of the side walls, so that each of the recesses 66 is configured for optionally supporting rollers 71 or balls 70 of the set of rolling elements and so that the individual recesses 66 are fully compatible to accommodate either rollers 71 or balls 70 of the same outer diameter, in accordance with the specifications of the adjusting device to be assembled. Rollers 71 and balls 70 can thus be freely interchanged and selected, e.g. at the stage of assembly of the adjusting device.

To ensure this interchangeability, the width of the recesses 66 in a direction transverse to the longitudinal direction of retainer 6 corresponds at least to the outer diameter of the balls 70, in which case the axial lengths of the rollers 71 will also correspond to the outer diameter of the balls 70. If, however, the recesses formed in the side walls, which define the concavely curved shape, are hemispherical, the balls 70 may be secured not only in longitudinal direction but also in a direction transverse to the longitudinal direction of retainer 6, so that the axial lengths of the rollers 71 may also be larger than the outer diameter of the balls 70. In any case the axial lengths of the rollers 71 will correspond to the width of the recesses 66 in the direction transverse to the longitudinal direction of retainer 6.

FIG. 2d shows a bottom view of a retainer 6 according to a further embodiment of the present invention. Also this embodiment comprises two sets of rolling elements, each consisting of a single roller 71 and three balls 70, which are disposed near the front side wall (not shown) and rear side wall (not shown) of the retainer 6, respectively. As shown in the enlarged perspective bottom view of FIG. 2e (detail J of FIG. 2d), the side walls 68 of the recesses 66 are interconnected via distance members 67 extending in longitudinal direction along the edge of bottom 60 of the retainer. The space between the side walls 68 is hollowed out to form a recess 69a, which is delimited by the distance members 67 and by the concavely-curved inner surfaces of side walls 68. Transverse protrusions 69b extend into these recesses 69a, which can be used as handles for deforming the side walls 68 during assembly of the rail or retainer. The hollowed-out recesses 69a enable a certain resiliency of the side walls 68 in the longitudinal direction, so that the balls 70 and rollers 71 can be easily inserted into the recesses 66 during assembly of the adjusting device at positions that may be application dependant.

Figure 1A:
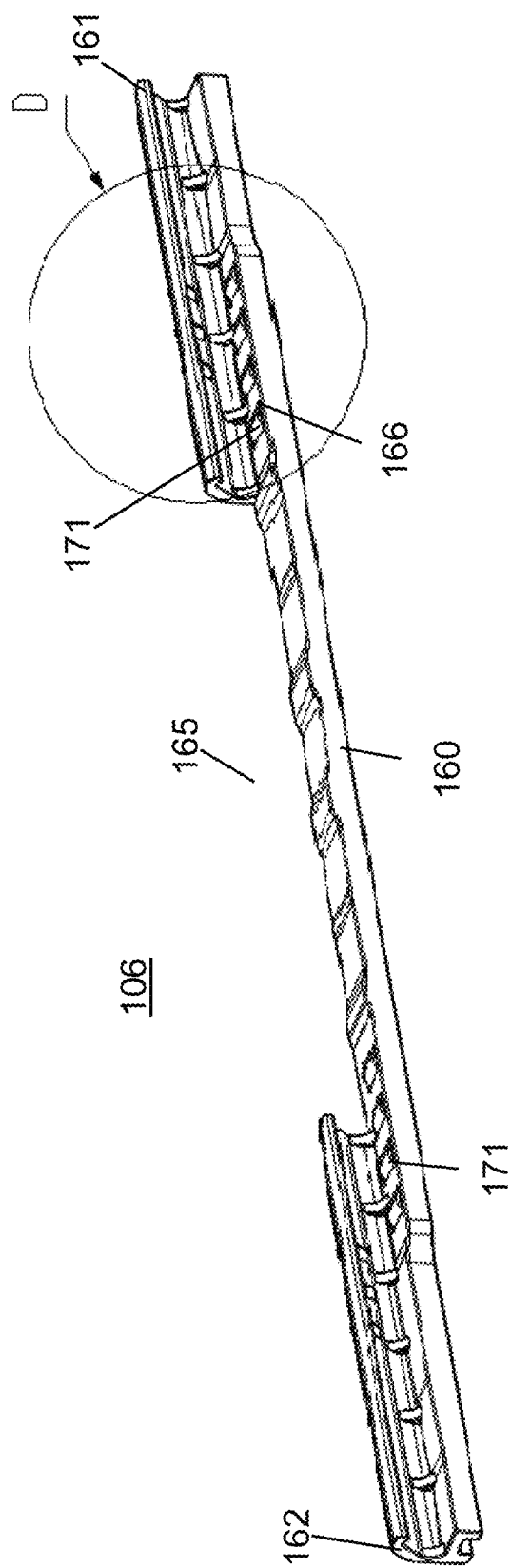
FIGS. 1a to 1c show a conventional retainer for an adjusting device for longitudinal adjustment of a vehicle seat in a perspective side view, an enlarged perspective top view and in a cross-sectional view.
Figure 1C:
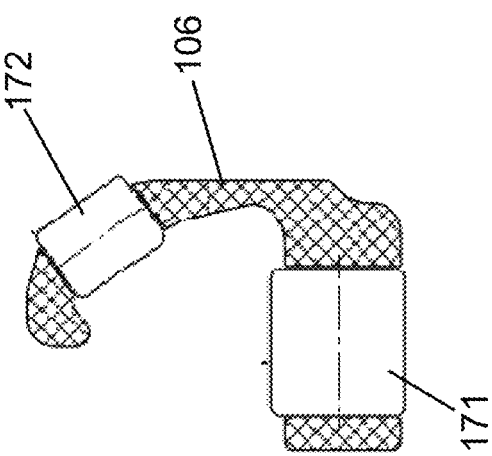
Figure 1B:
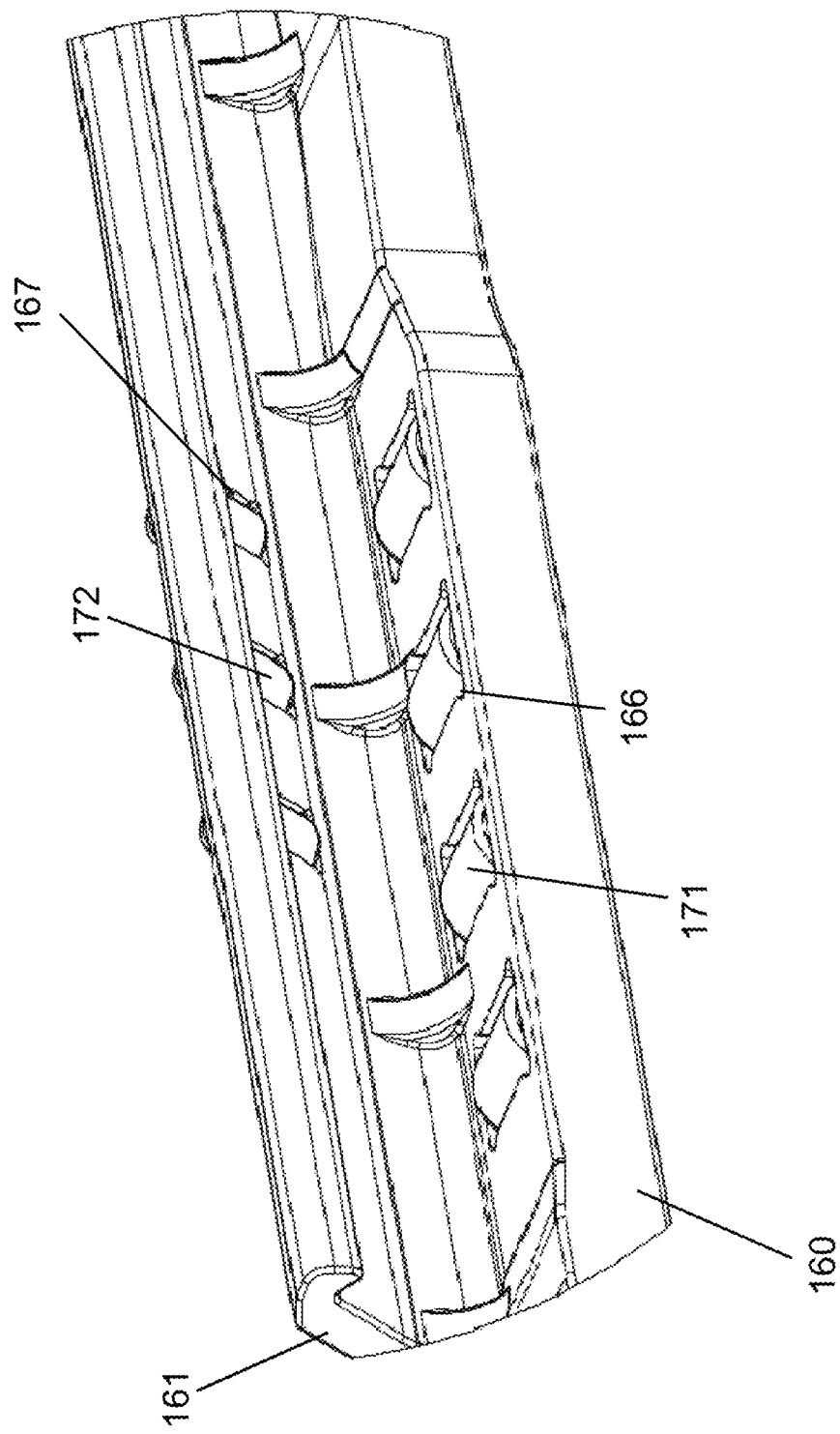
Figure 2H:
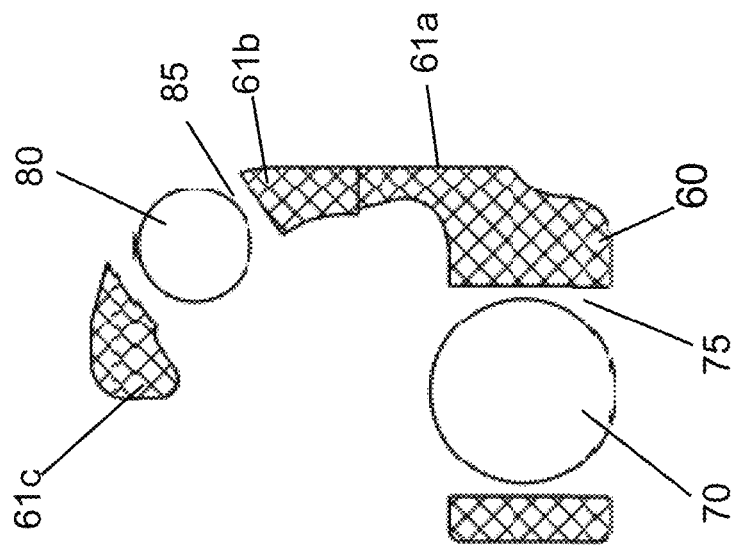
FIGS. 2g and 2h show the retainer of FIG. 2f in a cross-sectional view along G-G and H-H of FIG. 2f.
Figure 2G:
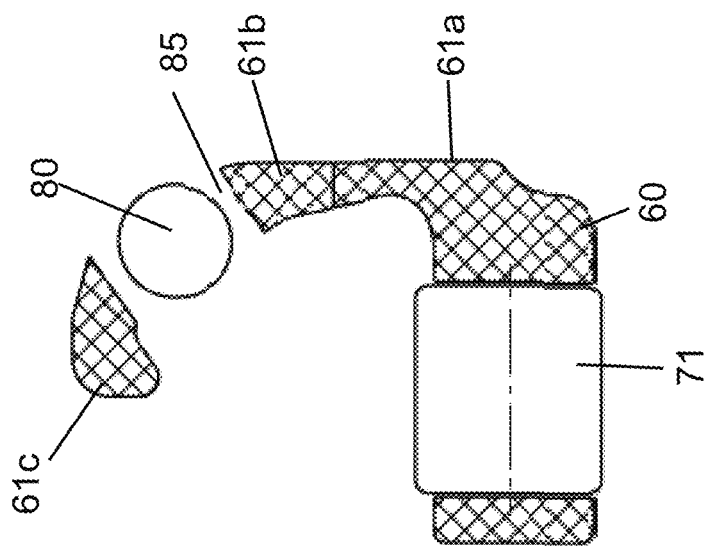

FIG. 2f shows the retainer of FIG. 2a in a rear view. FIGS. 2g and 2h show the retainer of FIG. 2f in a cross-sectional view along G-G and H-H of FIG. 2f. As shown in FIG. 2f, three balls 80 are accommodated and supported in the recesses of the rear side wall 61 and front side wall 62, respectively, of retainer 6. As shown in FIG. 2g, the balls 80 are accommodated and supported with a play in a direction perpendicular to the longitudinal direction of the retainer in these recesses, so that a gap 85 is formed between the ball 80 and the side walls of the recess of the retainer. As shown in FIG. 2h, also the balls 70 are accommodated and supported with a play in a direction perpendicular to the longitudinal direction of the retainer in these recesses, because the axial lengths of the rollers 71 exceeds the outer diameter of the balls 70, so that a gap 75 is formed between the ball 70 and the side walls of the recess of the retainer. The outer diameter of the balls 70 is larger than the outer diameter of the balls 80. In the same manner as explained above for the recesses in the bottom 60 of the retainer, also in the recesses of the rear side wall 61 and front side wall 62 optionally rollers or balls can be accommodated and supported.

FIG. 3a shows a bottom view of a retainer 6 according to a further embodiment of the present invention. This embodiment comprises two sets of rolling elements, each consisting of a two rollers 71 and two balls 70, which are disposed near the front side wall (not shown) and rear side wall (not shown) of the retainer 6, respectively. As shown in the enlarged perspective bottom view of FIG. 3b (detail K of FIG. 3a), the side walls 68 of the recesses 66 are interconnected via distance members 67 extending in longitudinal direction along the edge of bottom 60 of the retainer, as for the embodiment of FIGS. 2f and 2g.

Figure 4A:
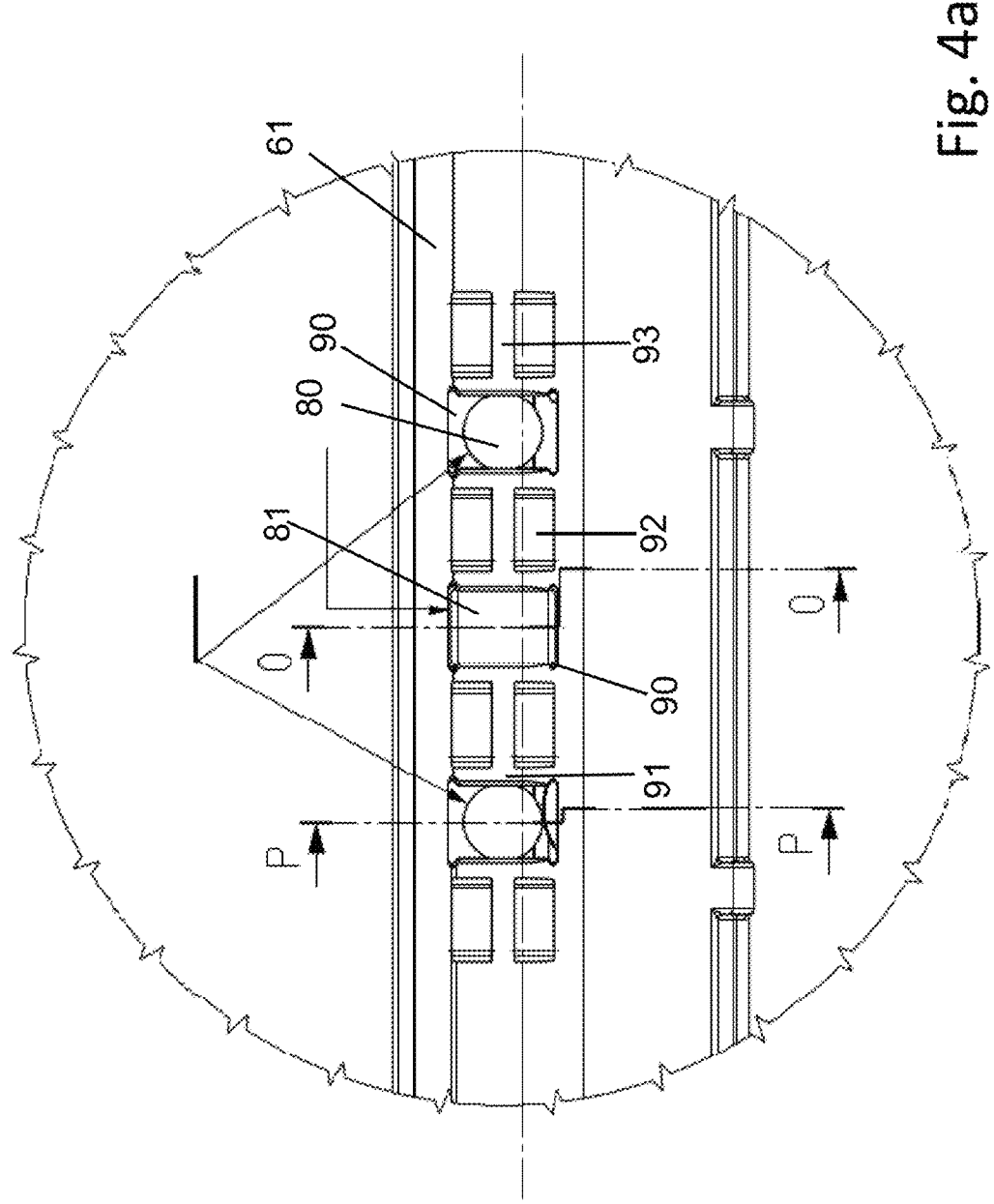
FIG. 4a shows a partial plan view of the upper side wall of a retainer according to a further embodiment of the present invention.

FIG. 4a shows a partial plan view of the upper side wall of a retainer according to a further embodiment of the present invention. According to this embodiment, rectangular recesses 90 are formed in the side wall 61, which are of a proper size to accommodate and support rollers 81. As shown in FIG. 4a, a single roller 81 and two balls 80 are accommodated and supported in these recesses, wherein the balls 80 are accommodated and supported with a certain play in a direction perpendicular to the longitudinal direction of the rail. At each side of the recesses 90, hollowed-out recesses 92 are formed, which enable a certain resiliency of the side walls 91 of the recesses 90, so that the balls 80 and rollers 81 can be easily inserted into the recesses 90 during assembly of the adjusting device at positions that may be application dependant. The lateral play allows the balls 80 of the set of rolling elements a little freedom to find their "best fit" position in actual use, and also prevents that the balls 80 roll always along the same track in longitudinal direction, thus ensuring a convenient adjustment with proper adjusting forces and at reduced wear.

Figure 4C:
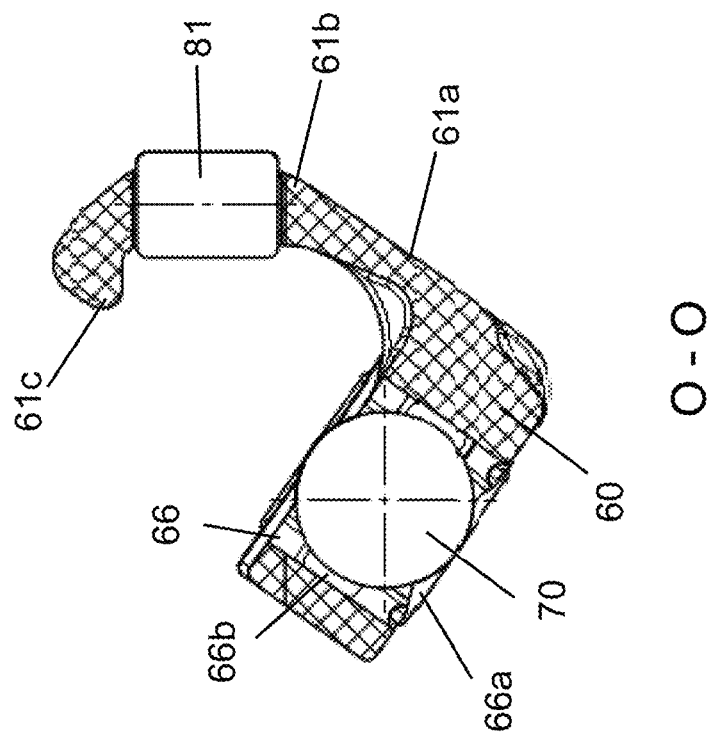
Figure 4B:
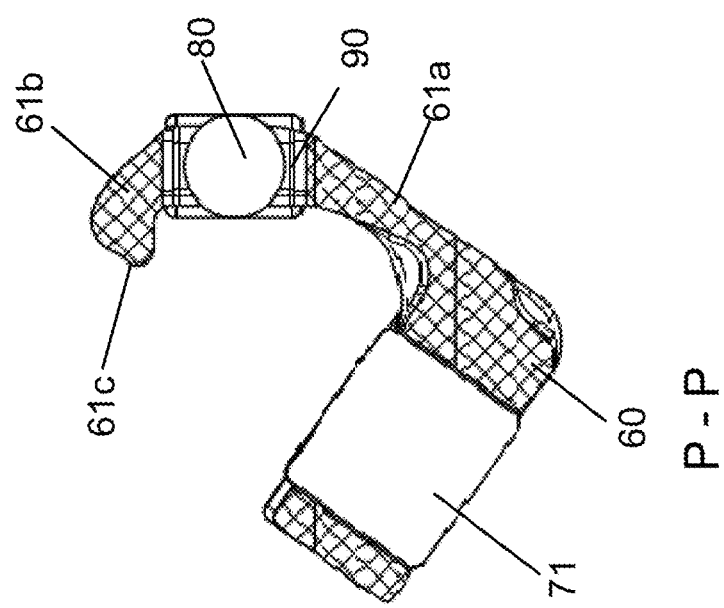

As shown in FIG. 4a, the recesses 90 are interconnected via longitudinal webs 93, which are formed integral with the side wall 61 of the retainer, but may also be formed as separate members to be inserted together with the suitable rolling elements into a longitudinal groove or aperture of the retainer. The recesses 90 are formed at equidistant spacing. FIGS. 4b and 4c show a cross-sectional view along P-P and O-O of the retainer of FIG. 4a. As shown in FIG. 4b, the ball 80 is accommodated and supported in the recess 90 of the side wall 61 with lateral play. Also the ball 70 may be accommodated and supported in the recess 66 of the bottom 60 with lateral play. However, as shown in FIG. 4c, centering elements 66a, 66b having concavely curved surfaces in accordance with the outer diameter of ball 70 may be provided along opposite sides of recess 60, for centering the ball 70 at a suitable position within recess 66, which is preferably a central position of recess 66.

FIG. 5a shows a partial plan view of the upper side wall of a retainer according to a further embodiment of the present invention. As shown in FIG. 5a, three balls 80 are accommodated and supported in the recesses 90 with a certain play in a direction perpendicular to the longitudinal direction of the rail. FIGS. 5b and 5c show a cross-sectional view along R-R and Q-Q of the retainer of FIG. 5a. As shown in FIG. 5b, the ends of the longitudinal webs 93 have concavely curved surfaces, in accordance with the outer diameter of the balls 80 to be supported. Thus, the balls 80 are accommodated and supported in the recesses 90 without play in the longitudinal direction of the rail.

FIG. 6a shows a partial plan view of the upper side wall of a retainer according to a further embodiment of the present invention. As shown in FIG. 6a, the recesses 90 are offset in a alternating sequence in a direction perpendicular to the longitudinal direction of the rail. The balls 80 may be accommodated and supported in the recesses 90 without lateral play, but may also be accommodated and supported in the recesses 90 with lateral play. Because of the lateral offset of the recesses 90, the balls 80 are prevented from rolling in the same track, but are forced to roll in independent tracks, which are offset relative to each other in a direction perpendicular to the longitudinal direction of the rail. FIG. 6b shows a cross-sectional view along N-N of the retainer of FIG. 6a.

FIG. 7a shows a partial plan view of the upper side wall of a retainer according to a further embodiment of the present invention. As shown in FIG. 7a, rectangular hollowed-out portions or recesses 92 are formed in the side wall 61 between the recesses 90 accommodating and supporting the balls 80. These recesses 92 enable a certain resiliency of the side walls 91 in the longitudinal direction, so that the balls 80 can be easily inserted into the recesses 90 during assembly of the adjusting device at positions that may be application dependant. As shown in FIG. 7a, centering elements 97 having concavely curved surfaces in accordance with the outer diameter of the balls 80 may be provided along opposite sides of recess 90, for centering the balls 80 at a suitable position within recess 90, which is preferably a central position of recess 90. FIG. 7b shows a cross-sectional view along M-M of the retainer of FIG. 7a.

As will become apparent to the skilled person from FIGS. 4a to 7b, the outer diameter of the balls accommodated and supported in the recesses of the upper side wall of retainer preferably is smaller than the outer diameter of the balls accommodated and supported in the recesses of the bottom wall of retainer, because the forces acting in vertical direction downward on the balls accommodated and supported in the recesses of the bottom wall of retainer are usually much larger than any lateral forces. As an example, the outer diameter of the balls accommodated and supported in the recesses of the upper side wall of retainer may be 3 mm, whereas the outer diameter of the balls accommodated and supported in the recesses of the bottom of recess may be 5 mm or larger.

As will become apparent to the skilled person from FIGS. 4a to 7b, also in the recesses formed in the upper side wall of retainer a suitable mixture of rollers and balls may be accommodated and supported, the order thereof being determined particularly by application needs.

As will become apparent to the skilled person upon studying the present application, the diagonally opposite linear guide, which has a hollow cylindrical shape in the embodiment of FIG. 8 for supporting a plurality of balls only (i.e. the upper linear guide on the left-hand side of FIG. 8), may also be replaced by a linear guide of basically rectangular shape, similar to the bottom linear guide on the right-hand side of FIG. 8, which would simply require a modification of the end portions of upper and lower rail 1, 2 in this region, particularly replacement of the semispherically curved first end portion 15 of upper rail 1 by a linear bearing leg similar to the third connecting leg 16 and replacement of the corner region formed between the second and third connecting leg 23, 24 of lower rail 2 by a linear bearing leg similar to the base leg 20. The present invention thus also envisages embodiments having two diametrically opposite bearing areas, each being of rectangular shape similar to the bottom linear guide on the right-hand side of FIG. 8.

As will become apparent to the skilled person upon studying the present application, a further related aspect of the present invention relates to a retainer of the configuration as set forth above for use in an adjusting device for longitudinal adjustment of a vehicle seat as set forth above. Such a retainer may be supplied as an individual element ready for assembly to manufacturers of such adjusting devices, be it with rolling elements already inserted into the recesses of the retainer at the desired positions or without such rolling elements. In the latter case, the manufacturer of such an adjusting device would simply insert the rolling elements into the recesses of the retainer at the desired positions during assembly, before the retainer is finally inserted into the gap between the upper and lower rail.

In comparison to conventional adjusting devices, the solution according to the present invention allows for the smoothest and lowest sliding efforts from a ball system while using the rollers to 'protect' the balls and raceway from brinelling. The number of balls and rollers and their locations in respect to one another would be application dependant. Thus, the adjusting device for longitudinal adjustment of a vehicle seat according to the present invention offers a convenient, smooth and rattle-free longitudinal adjustment while ensuring a high mechanical strength even in full forward and rearward position (measured with belt anchorage testing) or in the event of high frontal or side impacts and a much higher durability.

As will become apparent to the person skilled in the art, the above adjusting device may of course be combined with a conventional "easy entry" mechanism, such as the mechanism of the Applicant disclosed in U.S. Pat. No. 7,097,250 B2, to thereby further extend the travel range of the adjusting device.

LIST OF REFERENCE NUMERALS 1 upper rail
2 lower rail 3 rail/adjusting device for longitudinal adjustment
4 linear guide
5 linear guide
6 retainer
10 base leg
11 L-leg
12 first connecting leg
13 second (slanted) connecting leg
14 bending portion
15 first end portion
16 third connecting leg
17 second end portion/bearing leg
20 base leg
21 L-leg
22 first (slanted) connecting leg
23 second (slanted) connecting leg
24 third connecting leg
25 first end portion
26 fourth connecting leg
27 fifth connecting leg
28 sixth connecting leg
29 second end portion
60 bottom of retainer 6
61 rear side wall
61a upright base of rear side wall
61b slanted portion of rear side wall
61c front end of rear side wall
61d stiffening web
62 front side wall
65 longitudinal recess in side wall 61, 62 of retainer 6
66 recess for plural types of rolling elements
66a centering element
66b centering element
67 distance member/transverse web
68 side wall
69a recess
69b protrusion
70 ball
71 roller
75 gap
80 ball
81 roller
85 gap
90 recess for plural types of rolling elements
91 distance member/transverse web
92 recess
93 axial web
97 recessed supporting portion
106 retainer
160 bottom of retainer 106
161 rear side wall
162 front side wall
165 recess in side wall of retainer 106
166 recess for rollers 171
167 recess for rollers 172
171 roller
172 roller

What is claimed is:

1. An adjusting device for longitudinal adjustment of a vehicle seat, comprising:
a first rail and a second rail, the second rail being movably guided in a longitudinal direction relative to the first rail, and
a linear guide extending in the longitudinal direction and disposed between the first rail and the second rail in a bearing area, wherein
the linear guide comprises a retainer and a plurality of rolling elements,
the retainer comprises a bottom, a plurality of recesses being formed in the bottom of the retainer spaced apart from each other in the longitudinal direction, and
the rolling elements include a set of rolling elements comprising a single roller and a plurality of balls, wherein the single roller is supported in a foremost recess of the plurality of recesses formed in the bottom or in a rearmost recess of the plurality of recesses formed in the bottom, and the plurality of balls are supported in neighboring recesses formed in the bottom.

2. The adjusting device for longitudinal adjustment of a vehicle seat as claimed in claim 1, wherein the recesses are delimited by side walls extending perpendicular to the longitudinal direction, said side walls having concavely curved surfaces.

3. The adjusting device for longitudinal adjustment of a vehicle seat as claimed in claim 2, wherein the radii of curvature of the concavely curved surfaces of the side walls of the recesses are identical and wherein the outer diameters of the rollers and balls are identical so that the recesses are configured for optionally supporting rollers or balls.

4. The adjusting device for longitudinal adjustment of a vehicle seat as claimed in claim 2, wherein the side walls are formed by distance members having the same length so that the recesses are spaced apart from each other at equidistant spacing.

5. The adjusting device for longitudinal adjustment of a vehicle seat as claimed in claim 4, wherein the distance members are interconnected by longitudinal webs extending in the longitudinal direction and perpendicularly to the side walls.

6. An adjusting device for longitudinal adjustment of a vehicle seat, comprising:
a first rail and a second rail, the second rail being movably guided in a longitudinal direction relative to the first rail, and
a linear guide extending in the longitudinal direction and disposed between the first rail and the second rail in a bearing area, wherein
the linear guide comprises a retainer and a plurality of rolling elements,
the retainer comprises a bottom, a plurality of recesses being formed in the bottom of the retainer spaced apart from each other in the longitudinal direction, and
the rolling elements include a set of rolling elements comprising two rollers and a plurality of balls, wherein a first roller of the two rollers is supported in a foremost recess of the plurality of recesses formed in the bottom, a second roller of the two rollers is supported in a rearmost recess of the plurality of recesses formed in the bottom, and the plurality of balls are supported in neighboring recesses formed in the bottom.

7. The adjusting device for longitudinal adjustment of a vehicle seat as claimed in claim 1, wherein
the first rail is a lower rail of the adjusting device and comprises a first rail base leg, a connecting leg adjoining the first rail base leg and extending vertically upwardly and an inclined supporting leg, and
the second rail is an upper rail of the adjusting device and comprises a second rail base leg, an L-leg projecting substantially perpendicularly, a second rail connecting leg, which adjoins the L-leg and extends in parallel with the second rail base leg, and a bearing leg, which extends relative to the second rail connecting leg under an acute angle and towards an interior of the second rail, wherein
a lateral bearing area is formed by the first rail base leg and the connecting leg, and
a first set of the rolling elements is supported in the retainer between the first rail base leg and the connecting leg.

8. The adjusting device for longitudinal adjustment of a vehicle seat as claimed in claim 1, wherein the retainer is formed of a plastic material or a resin.

9. A retainer for supporting a plurality of rolling elements, for use in an adjusting device for longitudinal adjustment of a vehicle seat, comprising:
a bottom having a plurality of recesses formed in the bottom, wherein
the rolling elements are supported in the recesses formed in the bottom of the retainer spaced apart from each other in a longitudinal direction of the retainer, and
the rolling elements include a set of rolling elements comprising a single roller and a plurality of balls, wherein the single roller is supported in a foremost recess of the plurality of recesses formed in the bottom or in a rearmost recess of the plurality of recesses formed in the bottom, and the plurality of balls are supported in neighboring recesses formed in the bottom.

10. The retainer for supporting a plurality of rolling elements as claimed in claim 9, wherein the recesses are delimited by side walls extending perpendicular to the longitudinal direction, said side walls having concavely curved surfaces.

11. The retainer for supporting a plurality of rolling elements as claimed in claim 10, wherein the radii of curvature of the concavely curved surfaces of the side walls of the recesses are identical and wherein the outer diameters of the rollers and balls are identical so that the recesses are configured for optionally supporting rollers or balls.

12. The retainer for supporting a plurality of rolling elements as claimed in claim 10, wherein the side walls are formed by distance members having the same length so that the recesses are spaced apart from each other at equidistant spacing.

13. The retainer for supporting a plurality of rolling elements as claimed in claim 12, wherein the distance members are interconnected by longitudinal webs extending in the longitudinal direction and perpendicularly to the side walls.

14. A retainer for supporting a plurality of rolling elements, for use in an adjusting device for longitudinal adjustment of a vehicle seat, comprising:
a bottom having a plurality of recesses formed in the bottom, wherein
the rolling elements are supported in the recesses formed in the bottom of the retainer spaced apart from each other in a longitudinal direction of the retainer, and
the rolling elements include a set of rolling elements comprising two rollers and a plurality of balls, wherein a first roller of the two rollers is supported in a foremost recess of the plurality of recesses formed in the bottom, a second roller of the two rollers is supported in a rearmost recess of the plurality of recesses formed in the bottom, and the plurality of balls are supported in neighboring recesses formed in the bottom.

15. The adjusting device for longitudinal adjustment of a vehicle seat as claimed in claim 6, wherein the recesses are delimited by side walls extending perpendicular to the longitudinal direction, said side walls having concavely curved surfaces.

16. The adjusting device for longitudinal adjustment of a vehicle seat as claimed in claim 15, wherein the radii of curvature of the concavely curved surfaces of the side walls of the recesses are identical and wherein the outer diameters of the rollers and balls are identical so that the recesses are configured for optionally supporting rollers or balls.

17. The adjusting device for longitudinal adjustment of a vehicle seat as claimed in claim 15, wherein the side walls are formed by distance members having the same length so that the recesses are spaced apart from each other at equidistant spacing.

18. The adjusting device for longitudinal adjustment of a vehicle seat as claimed in claim 17, wherein the distance members are interconnected by longitudinal webs extending in the longitudinal direction and perpendicularly to the side walls.

19. The adjusting device for longitudinal adjustment of a vehicle seat as claimed in claim 6, wherein
the first rail is a lower rail of the adjusting device and comprises a first rail base leg, a connecting leg adjoining the first rail base leg and extending vertically upwardly and an inclined supporting leg, and
the second rail is an upper rail of the adjusting device and comprises a second rail base leg, an L-leg projecting substantially perpendicularly, a second rail connecting leg, which adjoins the L-leg and extends in parallel with the second rail base leg, and a bearing leg, which extends relative to the second rail connecting leg under an acute angle and towards an interior of the second rail, wherein
the lateral bearing area is formed by the first rail base leg and the connecting leg, and
a first set of the rolling elements is supported in the retainer between the first rail base leg and the connecting leg.

20. The adjusting device for longitudinal adjustment of a vehicle seat as claimed in claim 6, wherein the retainer is formed of a plastic material or a resin.

21. The retainer for supporting a plurality of rolling elements as claimed in claim 14, wherein the recesses are delimited by side walls extending perpendicular to the longitudinal direction, said side walls having concavely curved surfaces.

22. The retainer for supporting a plurality of rolling elements as claimed in claim 21, wherein the radii of curvature of the concavely curved surfaces of the side walls of the recesses are identical and wherein the outer diameters of the rollers and balls are identical so that the recesses are configured for optionally supporting rollers or balls.

23. The retainer for supporting a plurality of rolling elements as claimed in claim 21, wherein the side walls are formed by distance members having the same length so that the recesses are spaced apart from each other at equidistant spacing.

24. The retainer for supporting a plurality of rolling elements as claimed in claim 23, wherein the distance members are interconnected by longitudinal webs extending in the longitudinal direction and perpendicularly to the side walls.

25. The adjusting device for longitudinal adjustment of a vehicle seat as claimed in claim 1, wherein the retainer further comprises a slanted upper side wall, a plurality of second recesses being formed in the slanted upper side wall, wherein second rolling elements are supported in the second recesses spaced apart from each, wherein the second rolling elements include a set of rolling elements comprising a single roller and a plurality of balls.

26. The adjusting device for longitudinal adjustment of a vehicle seat as claimed in claim 6, wherein the retainer further comprises a slanted upper side wall, a plurality of second recesses being formed in the slanted upper side wall, wherein second rolling elements are supported in the second recesses spaced apart from each, wherein the second rolling elements include a set of rolling elements comprising a single roller and a plurality of balls.

27. The retainer for supporting a plurality of rolling elements as claimed in claim 9, further comprising a slanted upper side wall, a plurality of second recesses being formed in the slanted upper side wall, wherein second rolling elements are supported in the second recesses spaced apart from each, wherein the second rolling elements include a set of rolling elements comprising a single roller and a plurality of balls.

28. The retainer for supporting a plurality of rolling elements as claimed in claim 14, further comprising a slanted upper side wall, a plurality of second recesses being formed in the slanted upper side wall, wherein second rolling elements are supported in the second recesses spaced apart from each, wherein the second rolling elements include a set of rolling elements comprising a single roller and a plurality of balls.

* * * * *